US012785057B2

(12) United States Patent
Wildgoose

(10) Patent No.: US 12,785,057 B2
(45) Date of Patent: Nov. 3, 2026

(54) MASS SPECTROMETER HAVING HIGH SAMPLING DUTY CYCLE

(71) Applicant: Micromass UK Limited, Wilmslow (GB)

(72) Inventor: Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 348 days.

(21) Appl. No.: 18/578,838

(22) PCT Filed: Jul. 8, 2022

(86) PCT No.: PCT/GB2022/051771
§ 371 (c)(1),
(2) Date: Jan. 12, 2024

(87) PCT Pub. No.: WO2023/285791
PCT Pub. Date: Jan. 19, 2023

(65) Prior Publication Data

US 2024/0339314 A1 Oct. 10, 2024

(30) Foreign Application Priority Data

Jul. 14, 2021 (GB) ..................................... 2110152

(51) Int. Cl.
*H01J 49/40* (2006.01)
*H01J 49/00* (2006.01)
*H01J 49/06* (2006.01)

(52) U.S. Cl.
CPC ........ *H01J 49/406* (2013.01); *H01J 49/0031* (2013.01); *H01J 49/061* (2013.01)

(58) Field of Classification Search
CPC .... H01J 49/406; H01J 49/0031; H01J 49/061; H01J 49/0027; H01J 49/408; G01N 27/622
See application file for complete search history.

(56) References Cited

U.S. PATENT DOCUMENTS 3,898,452 A 8/1975 Hertel
4,390,784 A 6/1983 Browning et al.
(Continued)

FOREIGN PATENT DOCUMENTS

CA 2412657 C 2/2011
CN 101171660 A 4/2008
(Continued)

OTHER PUBLICATIONS

Artaev, V., "High resolution multi-reflecting time-of-flight mass analyzer with folded flight path HR MR-TOFMS FFP", pp. 1-19, Leco Corporation, httQS:/ /theanalyticalscientist.com/fileadmin/tas/app-notes/2021/Leco_FOLDED_FLIGHT_PATH_FFP_WHITE_PAPER 209-281-008.pdf (2021).
(Continued)

*Primary Examiner* — David A Vanore
(74) *Attorney, Agent, or Firm* — Goodwin Procter LLP

(57) ABSTRACT

A multi-reflecting time of flight mass spectrometer (8) comprising: a mass filter or mass separator (6); an ion accelerator (14) for pulsing packets of ions; ion mirrors (10) arranged to receive the ions from the ion accelerator (14) and reflect them in a first dimension (x-dimension) between the ion mirrors (10) as the ions travel in a second dimension (z-dimension); first (20) and second (22) ion reflectors arranged such that when they are both activated they reflect the ions back and forth in the second dimension; an ion detector (16) arranged to receive the ions, when a first of the ion reflectors (20,22) is deactivated; and control circuitry configured to: control the ion accelerator (14) to perform a first pulse sequence that pulses a first plurality of packets of ions into the ion mirrors (10); control the reflectors (20,22) such that ions in said plurality of packets are reflected back and forth in the second dimension by the reflectors (20,22) at the same time; and control the range of mass to charge (Continued)

$$DutyCycle = DutyCycle_{EFP} \times \frac{n\sqrt{M_L} - (n-1)\sqrt{M_H}}{(n-1)\sqrt{M_L} + \sqrt{M_H}}$$

ratios that is able to be transmitted by the mass filter or mass separator (6) to the ion accelerator (14), and the timings at which the first reflector (20) is activated and deactivated, such that substantially all of the ions from said plurality of packets of ions undergo the same number of reflections in the second dimension before being received at the detector (16).

17 Claims, 4 Drawing Sheets

(56) References Cited

U.S. PATENT DOCUMENTS 4,691,160 A 9/1987 Ino
4,731,532 A 3/1988 Frey et al.
4,855,595 A 8/1989 Blanchard
4,970,390 A 11/1990 Szymczak
5,017,780 A 5/1991 Kutscher et al.
5,107,109 A 4/1992 Stafford, Jr. et al.
5,128,543 A 7/1992 Reed et al.
5,202,563 A 4/1993 Cotter et al.
5,331,158 A 7/1994 Dowell
5,367,162 A 11/1994 Holland et al.
5,396,065 A 3/1995 Myerholtz et al.
5,435,309 A 7/1995 Thomas et al.
5,464,985 A 11/1995 Cornish et al.
5,619,034 A 4/1997 Reed et al.
5,652,427 A 7/1997 Whitehouse et al.
5,654,544 A 8/1997 Dresch
5,689,111 A 11/1997 Dresch et al.
5,696,375 A 12/1997 Park et al.
5,719,392 A 2/1998 Franzen
5,763,878 A 6/1998 Franzen
5,777,326 A 7/1998 Rockwood et al.
5,834,771 A 11/1998 Yoon et al.
5,847,385 A 12/1998 Dresch
5,869,829 A 2/1999 Dresch
5,896,829 A 4/1999 Rothenberg et al.
5,955,730 A 9/1999 Kerley et al.
5,994,695 A 11/1999 Young
6,002,122 A 12/1999 Wolf
6,013,913 A 1/2000 Hanson
6,020,586 A 2/2000 Dresch et al.
6,080,985 A 6/2000 Welkie et al.
6,107,625 A 8/2000 Park
6,160,256 A 12/2000 Ishihara
6,198,096 B1 3/2001 Le Cocq
6,229,142 B1 5/2001 Bateman et al.
6,271,917 B1 8/2001 Hagler
6,300,626 B1 10/2001 Brock et al.
6,316,768 B1 11/2001 Rockwood et al.
6,337,482 B1 1/2002 Francke
6,384,410 B1 5/2002 Kawato
6,393,367 B1 5/2002 Tang et al.
6,437,325 B1 8/2002 Reilly et al.
6,455,845 B1 9/2002 Li et al.
6,469,295 B1 10/2002 Park
6,489,610 B1 12/2002 Barofsky et al.
6,504,148 B1 1/2003 Hager
6,504,150 B1 1/2003 Verentchikov et al.
6,534,764 B1 3/2003 Verentchikov et al.
6,545,268 B1 4/2003 Verentchikov et al.
6,570,152 B1 5/2003 Hoyes
6,576,895 B1 6/2003 Park
6,580,070 B2 6/2003 Cornish et al.
6,591,121 B1 7/2003 Madarasz et al.
6,614,020 B2 9/2003 Cornish
6,627,877 B1 9/2003 Davis et al.
6,646,252 B1 11/2003 Gonin
6,647,347 B1 11/2003 Roushall et al.
6,664,545 B2 12/2003 Kimmel et al.
6,683,299 B2 1/2004 Fuhrer et al.
6,694,284 B1 2/2004 Nikoonahad et al.
6,717,132 B2 4/2004 Franzen
6,734,968 B1 5/2004 Wang et al.
6,737,642 B2 5/2004 Syage et al.
6,744,040 B2 6/2004 Park
6,744,042 B2 6/2004 Zajfman et al.
6,747,271 B2 6/2004 Gonin et al.
6,770,870 B2 8/2004 Vestal
6,782,342 B2 8/2004 LeGore et al.
6,787,760 B2 9/2004 Belov et al.
6,794,643 B2 9/2004 Russ, IV et al.
6,804,003 B1 10/2004 Wang et al.
6,815,673 B2 11/2004 Plomley et al.
6,833,544 B1 12/2004 Campbell et al.
6,836,742 B2 12/2004 Brekenfeld
6,841,936 B2 1/2005 Keller et al.
6,861,645 B2 3/2005 Franzen
6,864,479 B1 3/2005 Davis et al.
6,870,156 B2 3/2005 Rather
6,870,157 B1 3/2005 Zare
6,872,938 B2 3/2005 Makarov et al.
6,888,130 B1 5/2005 Gonin
6,900,431 B2 5/2005 Belov et al.
6,906,320 B2 6/2005 Sachs et al.
6,940,066 B2 9/2005 Makarov et al.
6,949,736 B2 9/2005 Ishihara
7,034,292 B1 4/2006 Whitehouse et al.
7,071,464 B2 7/2006 Reinhold
7,084,393 B2 8/2006 Fuhrer et al.
7,091,479 B2 8/2006 Hayek
7,126,114 B2 10/2006 Chernushevich
7,196,324 B2 3/2007 Verentchikov
7,217,919 B2 5/2007 Boyle et al.
7,221,251 B2 5/2007 Menegoli et al.
7,326,925 B2 2/2008 Verentchikov et al.
7,351,958 B2 4/2008 Vestal
7,365,313 B2 4/2008 Fuhrer et al.
7,385,187 B2 6/2008 Verentchikov et al.
7,388,197 B2 6/2008 McLean et al.
7,399,957 B2 7/2008 Parker et al.
7,423,259 B2 9/2008 Hidalgo et al.
7,498,569 B2 3/2009 Ding
7,501,621 B2 3/2009 Willis et al.
7,504,620 B2 3/2009 Sato et al.
7,521,671 B2 4/2009 Kirihara et al.
7,541,576 B2 6/2009 Belov et al.
7,582,864 B2 9/2009 Verentchikov
7,608,817 B2 10/2009 Flory
7,663,100 B2 2/2010 Vestal
7,675,031 B2 3/2010 Konicek et al.
7,709,789 B2 5/2010 Vestal et al.
7,728,289 B2 6/2010 Naya et al.
7,745,780 B2 6/2010 McLean et al.
7,755,036 B2 7/2010 Satoh
7,772,547 B2 8/2010 Verentchikov
7,800,054 B2 9/2010 Fuhrer et al.
7,825,373 B2 11/2010 Willis et al.
7,863,557 B2 1/2011 Brown
7,884,319 B2 2/2011 Willis et al.
7,932,491 B2 4/2011 Vestal
7,982,184 B2 7/2011 Sudakov
7,985,950 B2 7/2011 Makarov et al.
7,989,759 B2 8/2011 Holle
7,999,223 B2 8/2011 Makarov et al.
8,017,907 B2 9/2011 Willis et al.
8,017,909 B2 9/2011 Makarov et al.
8,063,360 B2 11/2011 Willis et al.
8,080,782 B2 12/2011 Hidalgo et al.
8,093,554 B2 1/2012 Makarov
8,237,111 B2 8/2012 Golikov et al.
8,354,634 B2 1/2013 Green et al.
8,373,120 B2 2/2013 Verentchikov
8,395,115 B2 3/2013 Makarov et al.
8,492,710 B2 7/2013 Fuhrer et al.
8,513,594 B2 8/2013 Makarov
8,633,436 B2 1/2014 Ugarov
8,637,815 B2 1/2014 Makarov et al.
8,642,948 B2 2/2014 Makarov et al.
8,642,951 B2 2/2014 Li
8,648,294 B2 2/2014 Prather et al.
8,653,446 B1 2/2014 Mordehai et al.

(56) References Cited

U.S. PATENT DOCUMENTS 8,658,984 B2 2/2014 Makarov et al.
8,680,481 B2 3/2014 Giannakopulos et al.
8,723,108 B1 5/2014 Ugarov
8,735,818 B2 5/2014 Kovtoun et al.
8,772,708 B2 7/2014 Kinugawa et al.
8,785,845 B2 7/2014 Loboda
8,847,155 B2 9/2014 Vestal
8,853,623 B2 10/2014 Verenchikov
8,884,220 B2 11/2014 Hoyes et al.
8,921,772 B2 12/2014 Verenchikov
8,952,325 B2 2/2015 Giles et al.
8,957,369 B2 2/2015 Makarov
8,975,592 B2 3/2015 Kobayashi et al.
9,048,080 B2 6/2015 Verenchikov et al.
9,082,597 B2 7/2015 Willis et al.
9,082,604 B2 7/2015 Verenchikov
9,099,287 B2 8/2015 Giannakopulos
9,136,101 B2 9/2015 Grinfeld et al.
9,147,563 B2 9/2015 Makarov
9,196,469 B2 11/2015 Makarov
9,207,206 B2 12/2015 Makarov
9,214,322 B2 12/2015 Kholomeev et al.
9,214,328 B2 12/2015 Hoyes et al.
9,281,175 B2 3/2016 Haufler et al.
9,312,119 B2 4/2016 Verenchikov
9,324,544 B2 4/2016 Rather
9,373,490 B1 6/2016 Nishiguchi et al.
9,396,922 B2 7/2016 Verenchikov et al.
9,417,211 B2 8/2016 Verenchikov
9,425,034 B2 8/2016 Verentchikov et al.
9,472,390 B2 10/2016 Verenchikov et al.
9,514,922 B2 12/2016 Watanabe et al.
9,576,778 B2 2/2017 Wang
9,595,431 B2 3/2017 Verenchikov
9,673,033 B2 6/2017 Grinfeld et al.
9,679,758 B2 6/2017 Grinfeld et al.
9,683,963 B2 6/2017 Verenchikov
9,728,384 B2 8/2017 Verenchikov
9,779,923 B2 10/2017 Verenchikov
9,786,484 B2 10/2017 Willis et al.
9,786,485 B2 10/2017 Ding et al.
9,824,877 B2 * 11/2017 Green ................. H01J 49/0031
9,865,441 B2 1/2018 Damoc et al.
9,865,445 B2 1/2018 Verenchikov et al.
9,870,903 B2 1/2018 Richardson et al.
9,870,906 B1 1/2018 Quarmby et al.
9,881,780 B2 1/2018 Verenchikov et al.
9,899,201 B1 2/2018 Park
9,922,812 B2 3/2018 Makarov
9,941,107 B2 4/2018 Verenchikov
9,972,483 B2 5/2018 Makarov
10,006,892 B2 6/2018 Verenchikov
10,037,873 B2 7/2018 Wang et al.
10,141,175 B2 11/2018 Verentchikov et al.
10,141,176 B2 11/2018 Stewart et al.
10,163,616 B2 12/2018 Verenchikov et al.
10,186,411 B2 1/2019 Makarov
10,192,723 B2 1/2019 Verenchikov et al.
10,290,480 B2 5/2019 Crowell et al.
10,373,815 B2 8/2019 Crowell et al.
10,388,503 B2 8/2019 Brown et al.
10,593,525 B2 3/2020 Hock et al.
10,593,533 B2 3/2020 Hoyes et al.
10,622,203 B2 4/2020 Veryovkin et al.
10,629,425 B2 4/2020 Hoyes et al.
10,636,646 B2 4/2020 Hoyes et al.
11,211,238 B2 12/2021 Verenchikov
11,239,067 B2 2/2022 Verenchikov et al.
11,295,944 B2 4/2022 Verenchikov
11,328,920 B2 5/2022 Hoyes et al.
11,342,175 B2 * 5/2022 Brown .................. H01J 49/061
11,621,156 B2 * 4/2023 Kozlov ................. H01J 49/406
250/282
11,705,320 B2 7/2023 Verenchikov
2001/0011703 A1 8/2001 Franzen
2001/0030284 A1 10/2001 Dresch et al.
2001/0054684 A1 * 12/2001 Park .................... H01J 49/0068
250/287
2002/0030159 A1 3/2002 Chernushevich et al.
2002/0107660 A1 8/2002 Nikoonahad et al.
2002/0190199 A1 12/2002 Li
2003/0001084 A1 * 1/2003 Bateman ............. H01J 49/4215
250/281
2003/0010907 A1 1/2003 Hayek et al.
2003/0111597 A1 6/2003 Gonin et al.
2003/0232445 A1 12/2003 Fulghum
2004/0026613 A1 2/2004 Bateman et al.
2004/0084613 A1 5/2004 Bateman et al.
2004/0108453 A1 6/2004 Kobayashi et al.
2004/0119012 A1 6/2004 Vestal
2004/0144918 A1 7/2004 Zare et al.
2004/0155187 A1 8/2004 Axelsson
2004/0159782 A1 8/2004 Park
2004/0164239 A1 8/2004 Franzen
2004/0183007 A1 9/2004 Belov et al.
2005/0006577 A1 1/2005 Fuhrer et al.
2005/0040326 A1 2/2005 Enke
2005/0103992 A1 5/2005 Yamaguchi et al.
2005/0133712 A1 6/2005 Belov et al.
2005/0151075 A1 7/2005 Brown et al.
2005/0194528 A1 9/2005 Yamaguchi et al.
2005/0194531 A1 9/2005 Chernushevich
2005/0242279 A1 11/2005 Verentchikov
2005/0258364 A1 11/2005 Whitehouse et al.
2006/0024720 A1 2/2006 McLean et al.
2006/0169882 A1 8/2006 Pau et al.
2006/0214100 A1 * 9/2006 Verentchikov .......... H01J 49/48
250/287
2006/0289746 A1 12/2006 Raznikov et al.
2007/0023645 A1 2/2007 Chernushevich
2007/0029473 A1 2/2007 Verentchikov
2007/0158545 A1 7/2007 Verentchikov
2007/0176090 A1 * 8/2007 Verentchikov ........ H01J 49/406
250/287
2007/0187614 A1 8/2007 Schneider et al.
2007/0194223 A1 8/2007 Sato et al.
2008/0049402 A1 2/2008 Han et al.
2008/0121796 A1 5/2008 Green et al.
2008/0197276 A1 8/2008 Nishiguchi et al.
2008/0203288 A1 8/2008 Makarov et al.
2008/0290269 A1 11/2008 Saito et al.
2009/0090861 A1 4/2009 Willis et al.
2009/0114808 A1 5/2009 Bateman et al.
2009/0121130 A1 5/2009 Satoh
2009/0206250 A1 8/2009 Wollnik
2009/0250607 A1 10/2009 Staats et al.
2009/0272890 A1 11/2009 Ogawa et al.
2009/0294658 A1 12/2009 Vestal et al.
2009/0302209 A1 * 12/2009 Green ................... H01J 49/065
250/282
2009/0314934 A1 12/2009 Brown
2010/0001180 A1 1/2010 Bateman et al.
2010/0044558 A1 2/2010 Sudakov
2010/0072360 A1 * 3/2010 Green ................... H01J 49/065
250/288
2010/0072363 A1 3/2010 Giles et al.
2010/0078551 A1 4/2010 Loboda
2010/0096543 A1 4/2010 Kenny et al.
2010/0140469 A1 6/2010 Nishiguchi
2010/0193681 A1 * 8/2010 Vestal ....................... H01J 3/14
250/281
2010/0193682 A1 8/2010 Golikov et al.
2010/0207023 A1 8/2010 Loboda
2010/0301202 A1 12/2010 Vestal
2011/0133073 A1 6/2011 Sato et al.
2011/0168880 A1 * 7/2011 Ristroph ............... H01J 49/406
250/282
2011/0180702 A1 7/2011 Flory et al.
2011/0180705 A1 7/2011 Yamaguchi
2011/0186729 A1 * 8/2011 Verentchikov .......... H01J 49/22
250/282
2012/0168618 A1 7/2012 Vestal
2012/0261570 A1 10/2012 Shvartsburg et al.

(56) References Cited

U.S. PATENT DOCUMENTS

| | | | | |
|---|---|---|---|---|
| 2012/0298853 | A1 | 11/2012 | Kurulugama et al. | |
| 2013/0048852 | A1* | 2/2013 | Verenchikov | H01J 49/22 250/282 |
| 2013/0056627 | A1* | 3/2013 | Verenchikov | H01J 49/406 250/282 |
| 2013/0068942 | A1 | 3/2013 | Verenchikov | |
| 2013/0161506 | A1 | 6/2013 | Ugarov | |
| 2013/0187044 | A1 | 7/2013 | Ding et al. | |
| 2013/0206978 | A1 | 8/2013 | Verenchikov et al. | |
| 2013/0240725 | A1 | 9/2013 | Makarov | |
| 2013/0248702 | A1 | 9/2013 | Makarov | |
| 2013/0256524 | A1 | 10/2013 | Brown et al. | |
| 2013/0313424 | A1 | 11/2013 | Makarov et al. | |
| 2013/0327935 | A1 | 12/2013 | Wiedenbeck | |
| 2014/0005445 | A1 | 1/2014 | Komplin et al. | |
| 2014/0048702 | A1* | 2/2014 | Green | H01J 49/063 250/281 |
| 2014/0054454 | A1 | 2/2014 | Hoyes et al. | |
| 2014/0054456 | A1 | 2/2014 | Kinugawa et al. | |
| 2014/0084156 | A1 | 3/2014 | Ristroph et al. | |
| 2014/0117226 | A1 | 5/2014 | Giannakopulos | |
| 2014/0138538 | A1 | 5/2014 | Hieftje et al. | |
| 2014/0183354 | A1 | 7/2014 | Moon et al. | |
| 2014/0191123 | A1 | 7/2014 | Wildgoose et al. | |
| 2014/0239172 | A1 | 8/2014 | Makarov | |
| 2014/0246575 | A1 | 9/2014 | Langridge et al. | |
| 2014/0291503 | A1 | 10/2014 | Shchepunov et al. | |
| 2014/0312221 | A1 | 10/2014 | Verenchikov et al. | |
| 2014/0361162 | A1 | 12/2014 | Murray et al. | |
| 2015/0028197 | A1 | 1/2015 | Grinfeld et al. | |
| 2015/0028198 | A1* | 1/2015 | Grinfeld | H01J 49/0031 250/281 |
| 2015/0034814 | A1 | 2/2015 | Brown et al. | |
| 2015/0048245 | A1 | 2/2015 | Vestal et al. | |
| 2015/0060656 | A1 | 3/2015 | Ugarov | |
| 2015/0090873 | A1 | 4/2015 | Brown et al. | |
| 2015/0122986 | A1 | 5/2015 | Haase | |
| 2015/0144779 | A1 | 5/2015 | Verenchikov | |
| 2015/0155147 | A1* | 6/2015 | Makarov | H01J 49/40 250/282 |
| 2015/0194296 | A1* | 7/2015 | Verenchikov | H01J 49/0027 250/282 |
| 2015/0228467 | A1 | 8/2015 | Grinfeld et al. | |
| 2015/0270115 | A1 | 9/2015 | Furuhashi | |
| 2015/0279650 | A1* | 10/2015 | Verenchikov | H01J 49/406 250/282 |
| 2015/0294849 | A1 | 10/2015 | Makarov et al. | |
| 2015/0318156 | A1 | 11/2015 | Loyd et al. | |
| 2015/0364309 | A1 | 12/2015 | Welkie | |
| 2015/0380206 | A1 | 12/2015 | White et al. | |
| 2015/0380233 | A1 | 12/2015 | Verenchikov | |
| 2016/0005587 | A1 | 1/2016 | Verenchikov | |
| 2016/0024036 | A1 | 1/2016 | Verenchikov | |
| 2016/0035558 | A1 | 2/2016 | Verenchikov et al. | |
| 2016/0079052 | A1 | 3/2016 | Makarov | |
| 2016/0225598 | A1 | 8/2016 | Ristroph | |
| 2016/0225602 | A1 | 8/2016 | Ristroph et al. | |
| 2016/0240363 | A1 | 8/2016 | Verenchikov | |
| 2017/0016863 | A1* | 1/2017 | Verenchikov | H01J 49/427 |
| 2017/0025265 | A1 | 1/2017 | Verenchikov et al. | |
| 2017/0032952 | A1* | 2/2017 | Verenchikov | H01J 49/0031 |
| 2017/0084443 | A1 | 3/2017 | Willis et al. | |
| 2017/0098533 | A1 | 4/2017 | Stewart et al. | |
| 2017/0168031 | A1 | 6/2017 | Verenchikov | |
| 2017/0169633 | A1 | 6/2017 | Leung et al. | |
| 2017/0229297 | A1 | 8/2017 | Green et al. | |
| 2017/0271141 | A1* | 9/2017 | Wildgoose | H01J 49/0086 |
| 2017/0309459 | A1 | 10/2017 | Tsukamoto et al. | |
| 2017/0338094 | A1 | 11/2017 | Verenchikov et al. | |
| 2017/0370889 | A1* | 12/2017 | Remes | G01N 30/8693 |
| 2018/0144921 | A1* | 5/2018 | Hoyes | H01J 49/0031 |
| 2018/0229297 | A1 | 8/2018 | Funakoshi et al. | |
| 2018/0315589 | A1 | 11/2018 | Oshiro | |
| 2018/0330936 | A1* | 11/2018 | Hoyes | H01J 49/107 |
| 2018/0366312 | A1 | 12/2018 | Hamish et al. | |
| 2018/0366313 | A1 | 12/2018 | Hoyes et al. | |
| 2019/0019664 | A1 | 1/2019 | Furuhashi et al. | |
| 2019/0180998 | A1 | 6/2019 | Stewart et al. | |
| 2019/0206669 | A1 | 7/2019 | Verenchikov et al. | |
| 2019/0237318 | A1 | 8/2019 | Brown | |
| 2019/0360981 | A1 | 11/2019 | Verenchikov | |
| 2020/0083034 | A1* | 3/2020 | Hoyes | H01J 49/403 |
| 2020/0090919 | A1* | 3/2020 | Artaev | H01J 49/0031 |
| 2020/0126781 | A1 | 4/2020 | Kovtoun | |
| 2020/0152440 | A1 | 5/2020 | Hoyes et al. | |
| 2020/0168447 | A1 | 5/2020 | Verenchikov | |
| 2020/0168448 | A1 | 5/2020 | Verenchikov et al. | |
| 2020/0243322 | A1* | 7/2020 | Stewart | H01J 49/406 |
| 2020/0365383 | A1* | 11/2020 | Verenchikov | H01J 49/403 |
| 2020/0373142 | A1 | 11/2020 | Verenchikov | |
| 2020/0373143 | A1 | 11/2020 | Verenchikov et al. | |
| 2020/0373145 | A1 | 11/2020 | Verenchikov et al. | |
| 2021/0134581 | A1* | 5/2021 | Verenchikov | H01J 49/405 |
| 2021/0134582 | A1* | 5/2021 | Kozlov | H01J 49/486 |
| 2021/0193451 | A1* | 6/2021 | Brown | H01J 49/401 |
| 2021/0272790 | A1* | 9/2021 | Stewart | H01J 49/40 |
| 2022/0157584 | A1* | 5/2022 | Giannakopulos | H01J 49/0045 |
| 2022/0165560 | A1 | 5/2022 | Wildgoose et al. | |
| 2023/0290629 | A1 | 9/2023 | Stewart et al. | |
| 2024/0339314 | A1* | 10/2024 | Wildgoose | H01J 49/061 |
| 2025/0218753 | A1* | 7/2025 | Wildgoose | H01J 49/0027 |

FOREIGN PATENT DOCUMENTS

| | | | | |
|---|---|---|---|---|
| CN | 101369510 | A | 2/2009 | |
| CN | 101523548 | A | 9/2009 | |
| CN | 102131563 | A | 7/2011 | |
| CN | 201946564 | U | 8/2011 | |
| CN | 102884608 | A | 1/2013 | |
| CN | 103270574 | A | 8/2013 | |
| CN | 103684817 | A | 3/2014 | |
| CN | 104067116 | A | 9/2014 | |
| CN | 104508475 | A | 4/2015 | |
| CN | 105206500 | A | 12/2015 | |
| CN | 106463337 | A | 2/2017 | |
| CN | 107636795 | A | 1/2018 | |
| CN | 206955673 | U | 2/2018 | |
| CN | 107833823 | A | 3/2018 | |
| CN | 107851549 | A | 3/2018 | |
| CN | 108292587 | A | 7/2018 | |
| DE | 4310106 | C1 | 10/1994 | |
| DE | 10116536 | A1 | 10/2002 | |
| DE | 102015121830 | A1 | 6/2017 | |
| DE | 102019129108 | A1 | 6/2020 | |
| DE | 112015001542 | B4 | 7/2020 | |
| EP | 0237259 | A2 | 9/1987 | |
| EP | 1137044 | A2 | 9/2001 | |
| EP | 1566828 | A2 | 8/2005 | |
| EP | 1901332 | A1 | 3/2008 | |
| EP | 2068346 | A2 | 6/2009 | |
| EP | 1665326 | B1 | 4/2010 | |
| EP | 1789987 | A4 | 9/2010 | |
| EP | 1522087 | B1 | 3/2011 | |
| EP | 2599104 | A1 | 6/2013 | |
| EP | 1743354 | B1 | 8/2019 | |
| EP | 3662501 | A1 | 6/2020 | |
| EP | 3662502 | A1 | 6/2020 | |
| EP | 3662503 | A1 | 6/2020 | |
| GB | 2080021 | A | 1/1982 | |
| GB | 2217907 | A | 11/1989 | |
| GB | 2274197 | A | 7/1994 | |
| GB | 2300296 | A | 10/1996 | |
| GB | 2390935 | A | 1/2004 | |
| GB | 2396742 | A | 6/2004 | |
| GB | 2403063 | A | 12/2004 | |
| GB | 2448203 | A * | 10/2008 | H01J 49/065 |
| GB | 2455977 | A | 7/2009 | |
| GB | 2476964 | A | 7/2011 | |
| GB | 2478300 | A | 9/2011 | |
| GB | 2484361 | B | 5/2012 | |
| GB | 2485825 | A | 5/2012 | |
| GB | 2484429 | B | 6/2012 | |
| GB | 2489094 | A | 9/2012 | |

(56) References Cited

FOREIGN PATENT DOCUMENTS

| | | | | | |
|---|---|---|---|---|---|
| GB | 2490571 | A | | 11/2012 | |
| GB | 2495127 | A | | 4/2013 | |
| GB | 2495221 | A | | 4/2013 | |
| GB | 2496991 | A | | 5/2013 | |
| GB | 2496994 | A | | 5/2013 | |
| GB | 2500743 | A | | 10/2013 | |
| GB | 2501332 | A | | 10/2013 | |
| GB | 2506362 | A | | 4/2014 | |
| GB | 2528875 | A | | 2/2016 | |
| GB | 2555609 | A | | 5/2018 | |
| GB | 2556451 | A | | 5/2018 | |
| GB | 2556830 | A | | 6/2018 | |
| GB | 2562990 | A | | 12/2018 | |
| GB | 2575157 | A | | 1/2020 | |
| GB | 2575339 | A | | 1/2020 | |
| GB | 2590600 | A | | 7/2021 | |
| GB | 2595530 | A | | 12/2021 | |
| GB | 2610692 | A | | 3/2023 | |
| JP | S6229049 | A | | 2/1987 | |
| JP | 2000036285 | A | | 2/2000 | |
| JP | 2000048764 | A | | 2/2000 | |
| JP | 2001297730 | A | | 10/2001 | |
| JP | 2003031178 | A | | 1/2003 | |
| JP | 2003502803 | A | | 1/2003 | |
| JP | 3571546 | B2 | | 9/2004 | |
| JP | 2005538346 | A | | 12/2005 | |
| JP | 2006049273 | A | | 2/2006 | |
| JP | 2007227042 | A | | 9/2007 | |
| JP | 2010062152 | A | | 3/2010 | |
| JP | 4649234 | B2 | | 3/2011 | |
| JP | 2011119279 | A | | 6/2011 | |
| JP | 4806214 | B2 | | 11/2011 | |
| JP | 2013528892 | A | | 7/2013 | |
| JP | 2013539590 | A | | 10/2013 | |
| JP | 5555582 | B2 | | 7/2014 | |
| JP | 2015506567 | A | | 3/2015 | |
| JP | 2015521349 | A | | 7/2015 | |
| JP | 2015185306 | A | | 10/2015 | |
| RU | 2564443 | C2 | | 10/2015 | |
| RU | 2015148627 | A | | 5/2017 | |
| RU | 2660655 | C2 | | 7/2018 | |
| SU | 198034 | A1 | | 6/1967 | |
| SU | 1681340 | A1 | | 9/1991 | |
| SU | 1725289 | A1 | | 4/1992 | |
| WO | 199103071 | A1 | | 3/1991 | |
| WO | 2013110587 | A | | 4/1992 | |
| WO | 1998001218 | A1 | | 1/1998 | |
| WO | 1998008244 | A2 | | 2/1998 | |
| WO | 199939369 | A1 | | 8/1999 | |
| WO | 200077823 | A2 | | 12/2000 | |
| WO | 2005001878 | A2 | | 1/2005 | |
| WO | 2005043575 | A2 | | 5/2005 | |
| WO | 2006049623 | A2 | | 5/2006 | |
| WO | 2006102430 | A2 | | 9/2006 | |
| WO | 2006103448 | A2 | | 10/2006 | |
| WO | 2007044696 | A1 | | 4/2007 | |
| WO | 2007104992 | A2 | | 9/2007 | |
| WO | 2007136373 | A1 | | 11/2007 | |
| WO | 2008046594 | A2 | | 4/2008 | |
| WO | 2008087389 | A2 | | 7/2008 | |
| WO | 2010008386 | A1 | | 1/2010 | |
| WO | 2010014077 | A1 | | 2/2010 | |
| WO | 2010034630 | A2 | | 4/2010 | |
| WO | 2010138781 | A2 | | 12/2010 | |
| WO | 2011086430 | A1 | | 7/2011 | |
| WO | 2011107836 | A1 | | 9/2011 | |
| WO | 2011135477 | A1 | | 11/2011 | |
| WO | 2012010894 | A1 | | 1/2012 | |
| WO | 2012013354 | A1 | | 2/2012 | |
| WO | 2012023031 | A2 | | 2/2012 | |
| WO | 2012024468 | A2 | | 2/2012 | |
| WO | 2012024570 | A2 | | 2/2012 | |
| WO | 2012116765 | A1 | | 9/2012 | |
| WO | 2013045428 | A1 | | 4/2013 | |
| WO | 2013063587 | A2 | | 5/2013 | |
| WO | 2013067366 | A2 | | 5/2013 | |
| WO | 2013093587 | A1 | | 6/2013 | |
| WO | 2013098612 | A1 | | 7/2013 | |
| WO | 2013110588 | A2 | | 8/2013 | |
| WO | 2013124207 | A1 | | 8/2013 | |
| WO | 2014021960 | A1 | | 2/2014 | |
| WO | 2014074822 | A1 | | 5/2014 | |
| WO | 2014110697 | A1 | | 7/2014 | |
| WO | 2014142897 | A1 | | 9/2014 | |
| WO | 2014152902 | A2 | | 9/2014 | |
| WO | 2015152968 | A1 | | 10/2015 | |
| WO | 2015153622 | A1 | | 10/2015 | |
| WO | 2015153630 | A1 | | 10/2015 | |
| WO | 2015153644 | A1 | | 10/2015 | |
| WO | 2015175988 | A1 | | 11/2015 | |
| WO | 2015189544 | A1 | | 12/2015 | |
| WO | 2016064398 | A1 | | 4/2016 | |
| WO | 2016174462 | A1 | | 11/2016 | |
| WO | 2016178029 | A1 | | 11/2016 | |
| WO | 2017042665 | A1 | | 3/2017 | |
| WO | WO-2017087470 | A1 | * | 5/2017 | .......... H01J 49/0004 |
| WO | 2018073589 | A1 | | 4/2018 | |
| WO | 2018109920 | A1 | | 6/2018 | |
| WO | 2018124861 | A2 | | 7/2018 | |
| WO | 2018183201 | A1 | | 10/2018 | |
| WO | WO-2018203082 | A1 | * | 11/2018 | ............ H01J 49/403 |
| WO | 2019030472 | A1 | | 2/2019 | |
| WO | 2019030474 | A1 | | 2/2019 | |
| WO | 2019030475 | A1 | | 2/2019 | |
| WO | 2019030476 | A1 | | 2/2019 | |
| WO | 2019030477 | A1 | | 2/2019 | |
| WO | WO-2019030473 | A1 | * | 2/2019 | ............ H01J 49/406 |
| WO | 2019058226 | A1 | | 3/2019 | |
| WO | 2019162687 | A1 | | 8/2019 | |
| WO | 2019202338 | A1 | | 10/2019 | |
| WO | WO-2019215429 | A1 | * | 11/2019 | ............ H01J 49/406 |
| WO | 2019229599 | A1 | | 12/2019 | |
| WO | 2020002940 | A1 | | 1/2020 | |
| WO | 2020021255 | A1 | | 1/2020 | |
| WO | 2020121167 | A1 | | 6/2020 | |
| WO | 2020121168 | A1 | | 6/2020 | |
| WO | 2021011415 | A1 | | 1/2021 | |
| WO | 2023285791 | A1 | | 1/2023 | |
| WO | WO-2023180715 | A1 | * | 9/2023 | ............ H01J 49/401 |
| WO | WO-2024161145 | A1 | * | 8/2024 | ............ H01J 49/401 |

OTHER PUBLICATIONS

Author unknown, "Einzel Lens", Wikipedia [online] Nov. 2020 [retrieved on Nov. 3, 2020]. Retrieved from Internet URL: https://en.wikipedia.org/wiki/Einzel_lens, 2 pages.

Author unknown, "Electrostatic lens ," Wikipedia, Mar. 31, 2017 (Mar. 31, 2017), XP055518392, Retrieved from the Internet: URL: https://en.wikipedia.org/w/index.phptitle=Electrostatic_lens oldid=773161674 [retrieved on Oct. 24, 2018].

Barry Shaulis et al: "Signal linearity of an extended range pulse counting detector: Applications to accurate and precise U-Pb dating of zircon by laser ablation quadrupole ICP-MS", G3: Geochemistry, Geophysics, Geosystems, 11(11):1-12, Nov. 20, 2010.

Carey, D.C., "Why a second-order magnetic optical achromat works", Nucl. Instrum. Meth., 189(203):365-367 (1981). Abstract.

Collision Frequency, https://en.wikipedia.org/wiki/Collision_frequency accessed Aug. 17, 2021.

Combined Search and Examination Report for United Kingdom Patent Application No. GB2210080.4, mailed Jan. 10, 2023.

Doroshenko, V.M., and Cotter, R.J., "Ideal velocity focusing in a reflectron time-of-flight mass spectrometer", American Society for Mass Spectrometry, 10(10):992-999 (1999).

Guan S., et al. "Stacked-ring electrostatic ion guide", Journal of the American Society for Mass Spectrometry, Elsevier Science Inc, 7(1):101-106 (1996).

Hasin, Y. I., et al., "Planar Time-Of-Flight Multireflecting Mass Spectrometer with an Orthogonal Ion Injection Out of Continuous Ion Sources" Institute for Analytical Instrucmentation RAS, Saint-Petersburg, (2006) Abstract.

(56) References Cited

OTHER PUBLICATIONS

Hoyes et al., "Electrostatic gimbal for correction of errors in Time of Flight mass spectrometers", Waters, 2013.
Hussein, O.A. et al., "Study the most favorable shapes of electrostatic quadrupole doublet lenses" , AIP Conference Proceedings, vol. 1815, Feb. 17, 2017 (Feb. 17, 2017), p. 110003.
International Search Report and Written Opinion for International Patent Application No. PCT/GB2022/051771, mailed Sep. 22, 2022.
Kaufmann, R., et al., "Sequencing of peptides in a time-of-flight mass spectrometer: evaluation of postsource decay following matrix-assisted laser desorption ionisation (MALDI)", International Journal of Mass Spectrometry and Ion Processes, Elsevier Scientific Publishing Co. Amsterdam, NL, 31:355-385, Feb. 24, 1994.
Khasin, Y. I. et al. "Initial Experimenatl Studies of a Planar Multireflection Time-Of-Flight Mass Spectrometer" Institute for Analytical Instrucmentation RAS, Saint-Petersburg, (2004) Abstract.
Kozlov, B. et al. "Enhanced Mass Accuracy in Multi-Reflecting TOF MS" www.waters.com/posters, ASMS Conference (2017).
Kozlov, B. et al. "Fast lon Mobility Spectrometry and High Resolution TOF MS" ASMS Conference Poster (2014).
Kozlov, B. et al. "High accuracy self-calibration method for high resolution mass spectra" ASMS Conference Abstract, 2019.
Kozlov, B. et al. "Multiplexed Operation of an Orthogonal Multi-Reflecting TOF Instrument to Increase Duty Cycle by Two Orders" ASMS Conference, San Diego, CA, Jun. 6, 2018.
Kozlov, B. N. et al., "Experimental Studies of Space Charge Effects in Multireflecting Time-Of-Flight Mass Spectrometes" Institute for Analytical Instrucmentation RAS, Saint-Petersburg, (2006) Abstract.
Kozlov, B. N. et al., "Multireflecting Time-Of-Flight Mass Spectrometer With an Ion Trap Source" Institute for Analytical Instrucmentation RAS, Saint-Petersburg, (2006) Abstract.
Lutvinsky Y. I. et al., "Estimation of Capacity of High Resolution Mass Spectra for Analysis of Complex Mixtures" Institute for Analytical Instrucmentation RAS, Saint-Petersburg, (2006) Abstract.
N/a: "Electrostatic lens," Wikipedia, Mar. 31, 2017 (Mar. 31, 2017), XP055518392, Retrieved from the Internet: URL: https://en.wikipedia.org/w/index.phptitle=Electrostatic lens oldid=773161674[retrieved on Oct. 24, 2018].
O'Halloran, G.J., et al., "Determination of Chemical Species Prevalent in a Plasma Jet", Bendix Corp Report ASD-TDR-62-644, U.S. Air Force (1964). Abstract.
Reflectron - Wikipedia, Oct. 9, 2015, Retrieved from the Internet URL:https://en.wikipedia.org/w/index.phpt itle=Reflectron oldid=684843442 [retrieved on May 29, 2019].
Sakurai et al., "A New Multi-Passage Time-of-Flight Mass Spectrometer at JAIST", Nuclear Instruments and Methods in Physics Research, Section A, Elsevier, 427(1-2): 182-186, May 11, 1999. Abstract.
Sakurai, T. et al., "Ion optics for time-of-flight mass spectrometers with multiple symmetry", Int J Mass Spectrom Ion Proc 63(2-3):273-287 (1985). Abstract.
Scherer, S., et al., "A novel principle for an ion mirror design in time-of-flight mass spectrometry", International Journal of Mass Spectrometry, Elsevier Science Publishers, Amsterdam, NL, vol. 251, No. 1, Mar. 15, 2006.
Search Report for United Kingdom Patent Application No. GB2110152.2, mailed Apr. 14, 2022.
Stresau, D., et al.: "Ion Counting Beyond 10ghz Using a New Detector and Conventional Electronics", European Winter Conference on Plasma Spectrochemistry, Feb. 4-8, 2001, Lillehammer, Norway, Retrieved from the Internet: URL:https://www.etp-ms.com/file-repository/21 [retrieved on Jul. 31, 2019].
Toyoda et al., "Multi-Turn-Time-of-Flight Mass Spectometers with Electrostatic Sectors", Journal of Mass Spectrometry, 38: 1125-1142, Jan. 1, 2003.
Verenchicov, A. N. "Parallel MS-MS Analysis in a Time-Flight Tandem. Problem Statement, Method, and Instrucmental Schemes" Institute for Analytical Instrucmentation RAS, Saint-Petersburg, (2004) Abstract.
Verenchicov, A. N. "The Concept of Multireflecting Mass Spectrometer for Continuous Ion Sources" Institute for Analytical Instrucmentation RAS, Saint-Petersburg, (2006) Abstract.
Verenchicov, A. N. et al. "Stability of Ion Motion in Periodic Electrostatic Fields" Institute for Analytical Instrumentation RAS, Saint-Petersburg, (2004) Abstract.
Verenchicov, A. N., et al. "Accurate Mass Measurements for Inerpreting Spectra of atmospheric Pressure Ionization" Institute for Analytical Instrucmentation RAS, Saint-Petersburg, (2006) Abstract.
Verenchicov., A. N. et al. "Multiplexing in Multi-Reflecting TOF MS" Journal of Applied Solution Chemistry and Modeling, 6:1-22 (2017).
Verentchikov et al., "Stable ion beam transport through periodic electrostatic structures: linear and non-linear effects", Physics Procedia vol. 1, No. 1, pp. 87-97, Aug. 2008.
Wikipedia, Collision Frequency [online] [accessed on Aug. 17, 20210]. Retrieved from Internet URL: https://en.wikipedia.org/wiki/Collision_frequency, 2 pages.
Willis, P., et al., "Improving duty cycle in the Folded Flight Path high-resolution time-of-flight mass spectrometer", International Journal of Mass Spectrometry, vol. 459, 116467, Nov. 1, 2020.
Wollnik, H., and Casares, A., "An energy-isochronous multi-pass time-of-flight mass spectrometer consisting of two coaxial electrostatic mirrors", Int J Mass Spectrom 227:217-222 (2003). Abstract.
Wouters et al., "Optical Design of the TOFI (Time-of-Flight Isochronous) Spectrometer for Mass Measurements of Exotic Nuclei", Nuclear Instruments and Methods in Physics Research, Section A, 240(1): 77-90, Oct. 1, 1985.
Yavor, M. I. "Planar Multireflection Time-Of-Flight Mass Analyser with Unlimited Mass Range" Institute for Analytical Instrucmentation RAS, Saint-Petersburg, (2004) Abstract.
Yavor, M.I., et al., "High performance gridless ion mirrors for multi-reflection time-of-flight and electrostatic trap mass analyzers", International Journal of Mass Spectrometry, vol. 426, Mar. 2018, pp. 1-11.

* cited by examiner $$DutyCycle = DutyCycle_{EFP} \times \frac{n\sqrt{M_L} - (n-1)\sqrt{M_H}}{(n-1)\sqrt{M_L} + \sqrt{M_H}}$$

MASS SPECTROMETER HAVING HIGH SAMPLING DUTY CYCLE

CROSS-REFERENCE TO RELATED APPLICATIONS

This application is a U.S. national phase filing claiming the benefit of and priority to International Patent Application No. PCT/GB2022/051771, filed Jul. 8, 2022, which claims priority from and the benefit of United Kingdom patent application No. 2110152.2 filed on 14 Jul. 14, 2021. The entire contents of these applications are incorporated herein by reference.

FIELD OF THE INVENTION

The present invention relates generally to mass spectrometers and ion mobility spectrometers that repeatedly pulse ions into a separation region so as to cause the ions to separate according to mass to charge ratio or ion mobility.

BACKGROUND

A Time of Flight (TOF) mass analyser is a known form of mass analyser that has an ion accelerator that pulses a packet of ions into a time of flight region (e.g. a field-free region) and towards an ion detector. The ions separate out according to their mass to charge ratios, as they pass through the time of flight region, and then strike an ion detector. As such, the separated ions arrive at the ion detector at different times, wherein the time at which an ion arrives at the detector is related to its mass to charge ratio. The mass to charge ratio of a given ion can be determined from the duration of time between the time at which it was pulsed into the time of flight region and the time at which it was detected by the ion detector. The mass analyser is therefore able to determine the mass to charge ratios of the ions pulsed into the mass analyser and their intensities and form a mass spectrum.

In order to provide the mass analyser with a high mass resolution it is desired to provide the ions with a long flight path through the time of flight region, as this enables ions of different mass to charge ratios to separate out to a greater degree as they travel though the time of flight region. Multi-Reflecting TOF (MRTOF) mass analysers provide such a long flight path length in the time of flight region by reflecting the ions multiple times between ion mirrors as the ions drift from the ion accelerator at a first end of the mass analyser towards an ion detector arranged at a second, opposite end of the mass analyser. Alternatively, in order to increase the length of the flight path (and hence mass resolution) yet further, it is known to reflect the ions such that they drift back and forth between the first and second ends of the mass analyser, also being reflected between the mirrors as they do so, before the ions are allowed to be ejected from the time of flight region onto the detector. This mode of operation is known in the art as multi-pass or "Zoom" mode of operation.

As is known in the art, TOF mass analysers repeatedly pulse (i.e. push) packets of ions into the time of flight region during a single experimental run and obtain mass spectral data for the ions detected from each of these pulses. The mass spectral data detected from multiple pulses that occur over a predetermined amount of time (i.e. a predetermined number of pulses) may be summed so as to form a composite mass spectrum. Historically, the duration of time between adjacent pulses was set to be sufficiently long that the slowest ion of interest (i.e. the heaviest mass to charge ratio of interest) from any given pulse has time to traverse the time of flight region and reach the detector before the subsequent pulse is performed. This was conducted so as to prevent the detection of fast ions from one pulse being determined to be associated with spectral data of ions from a preceding pulse.

As MRTOF mass analysers provide relatively long ion flight paths and hence long flight times to the detector, the above constraint led to the ion accelerator being operated such that the pulses were relatively infrequently. This led to a poor sampling duty cycle, which is typically less than 0.05% in the Zoom mode.

It is known to increase the sampling duty cycle of a TOF mass analyser by using an Encoded Frequent Pulsing (EFP) technique that operates the ion accelerator such that the duration between adjacent pulses is less than the flight time of the heaviest mass to charge ratio desired to be analysed. In such a technique, the ion accelerator is controlled so as to perform a sequence of pulses that are arranged such that the duration between any pair of pulses in the sequence is different to the duration between any other pair of pulses within the sequence. Although ions of interest from different pulses will arrive at the detector in overlapping time periods, the mass analyser is able to decode the resulting spectral data so as to determine which spectral data relates to each pulse by using the timings of the pulses in the EFP sequence.

However, it has not been possible to use EFP techniques to improve the sampling duty cycle of a mass analyser being operated in a multi-pass or Zoom mode. In particular, once ions from one pulse have been reflected back and forth between the first and second ends of the mass analyser the desired number of times and allowed to pass to the detector, ions from one or more subsequent pulse are also able to pass to the detector. This leads to ions from different pulses undergoing different flight path lengths within the mass analyser, which is clearly not acceptable in a time of flight mass analyser.

SUMMARY

From a first aspect the present invention provides a multi-reflecting time of flight mass spectrometer comprising; a mass filter or mass separator; an ion accelerator for pulsing packets of ions; ion mirrors arranged to receive the ions from the ion accelerator and reflect them in a first dimension (x-dimension) between the ion mirrors as the ions travel in a second dimension (z-dimension); first and second ion reflectors arranged such that when they are both activated they reflect the ions back and forth in the second dimension; an ion detector arranged to receive the ions, when a first of the ion reflectors is deactivated; and control circuitry configured to: control the ion accelerator to perform a first pulse sequence that pulses a first plurality of packets of ions into the ion mirrors; control the reflectors such that ions in said plurality of packets are reflected back and forth in the second dimension by the reflectors at the same time; and control the range of mass to charge ratios that is able to be transmitted by the mass filter or mass separator to the ion accelerator, and the timings at which the first reflector is activated and deactivated, such that substantially all of the ions from said plurality of packets of ions undergo the same number of reflections in the second dimension before being received at the detector.

The inventors of the present invention have recognised that by restricting the range of mass to charge ratios that is transmitted to the ion accelerator during the pulse sequence, the reflectors can be controllably activated and deactivated so as to ensure that even when the plurality of packets of ions are pulsed into the ion mirrors during overlapping time periods, substantially all of the ions in the different ion packets undergo the same number of reflections in the second dimension before being received at the detector.

The mass filter or mass separator is controlled to provide only a restricted range of mass to charge ratios to the ion accelerator.

The spectrometer may have a user interface that is configured so that a user may input a range of mass to charge ratios that is desired to be analysed and the spectrometer may be configured to then control the mass filter or mass separator in response such that the range of mass to charge ratios that is transmitted by the mass filter or mass separator is the range that was input at the user interface.

The mass filter may be a device that is configured and controlled such that ions having mass to charge ratios in said range of ions are transmitted, whilst ions having other mass to charge ratios are filtered out. For example, the mass filter may be a quadrupole mass filter. The mass separator may be a device that separates ions according to mass to charge ratio and only onwardly transmits ions having the desired range of mass to charge ratios. For example, the mass separator may pulse ions into a time of flight region in which ions separate according to mass to charge ratio. An ion gate may be located at the end of the time of flight region and may open only for a duration of time so as to transmit the desired range of mass to charge ratios. It is also contemplated that a mass selective ion trap may be used to supply ions of the desired range of mass to charge ratio.

The spectrometer may comprise an orthogonal acceleration MRTOF mass analyser having said ion accelerator, ion mirrors, reflectors and detector. The ion accelerator may therefore accelerate ions in an orthogonal direction to that which it receives them.

The ion mirrors may be two ion mirrors that are spaced apart from each other in the first dimension and that may each be elongated in the second dimension. The ions mirrors may be parallel and/or may be the same length in the second dimension. The ion mirrors are preferably reflectrons.

The second dimension may be orthogonal to the first dimension.

The first pulse sequence may be an encoded frequent pulse sequence in which the duration between any two pulses in the first pulse sequence is different to the duration between any other two pulses in the first pulse sequence. That is, it is not only the duration between any two adjacent pulses in the pulse sequence that is unique, but the duration between any two of the (non-adjacent) pulses in the sequence is also unique.

The spectrometer is configured to detect the ions at the detector and generate mass spectral data for those ions. The spectrometer is also configured to decode the mass spectral data using the timings of the pulses in the encoded frequent pulsing. The spectrometer may therefore decode the mass spectral data so as to determine which mass spectral data relates to which pulse of ions.

The first pulse sequence consists of a plurality of pulses, starting with a first pulse and ending with a final pulse. The control circuitry may be configured to change the first reflector from being in a deactivated state, in which it does not reflect ions in the second dimension, to being in an activated state, in which it does reflect ions in the second dimension, at a time corresponding to the time that the lowest mass to charge ratio ion from said first pulse would reach the first reflector for the first time, e.g. after having travelled a distance in the second dimension that is at least from one end of the ion mirrors to the other end of the ion mirrors.

For the avoidance of doubt, the lowest mass to charge ratio is the lowest mass to charge ratio in said range of mass to charge ratios that is able to be transmitted by the mass filter or mass separator.

The control circuitry may be configured to: maintain the first reflector activated for a period of time substantially corresponding to the time that said lowest mass to charge ratio ion from said first pulse would take to travel an integer number n of round trips from the first reflector to the second reflector and back to the first reflector; and to deactivate the first reflector at the end of said period of time such that said lowest mass to charge ratio ion may pass to the detector.

Said integer number of round trips may be ≥1; ≥2; ≥3; ≥4; ≥5; ≥6; ≥7; ≥8; ≥9; or ≥10 round trips.

The spectrometer may have a user interface that is configured so that a user may input said integer number of round trips and the control circuitry may be configured to then control the first reflector in response thereto so as to perform the above method.

The first reflector may be deactivated when (e.g. immediately before) the lowest mass to charge ratio ion from said first pulse would reach the first reflector after having undergone said integer number of round trips.

The heaviest mass to charge ratio ion from the final pulse in the first pulse sequence must reach the first reflector whilst it is still activated in order to perform the desired number of reflections in the second dimension. As such, the control circuitry may be configured to control the ion accelerator such that the final pulse in the first pulse sequence occurs at least a time Tx before the first reflector is deactivated, wherein Tx is the time it would take the highest mass to charge ratio ion in said range of mass to charge ratios to travel from the ion accelerator to said first reflector and then travel n−1 round trips from the first reflector to the second reflector and back to the first reflector.

The first reflector may be deactivated after (e.g. immediately after) the highest mass to charge ratio ion has made said n−1 round trips and been reflected by the first reflector.

When the highest mass to charge ratio ion arrives at the first reflector the next time, the first reflector will have been deactivated and the highest mass to charge ratio ion will be able to pass to the detector.

The control circuitry may be configured to: control the ion accelerator to perform a second pulse sequence that pulses a second plurality of packets of ions into the ion mirrors; control the reflectors such that ions in said second plurality of packets are reflected back and forth in the second dimension by the reflectors at the same time; and control the range of mass to charge ratios that is able to be transmitted by the mass filter or mass separator to the ion accelerator, and the timings at which the first reflector is activated and deactivated, such that substantially all of the ions from said second plurality of packets of ions undergo the same number of reflections in the second dimension before being received at the detector.

The control circuitry may be configured to reactivate the first reflector at a time Tr after the first reflector was deactivated, wherein Tr is at least the time it takes the heaviest mass to charge ratio ion from a pulse in the first pulse sequence to make one of said round trips from the first reflector to the second reflector and back to the first reflector.

The range of mass to charge ratios that is able to be transmitted by the mass filter or mass separator for the second pulse sequence may be different to the range of mass to charge ratios that is able to be transmitted for the first pulse sequence. In these embodiments, the timings of the pulses in any given pulse sequence, and the timings that the reflectors are activated and deactivated in order to analyse the ions from those pulses, will be selected based on the range of mass to charge ratios that is transmitted by the mass filter or mass separator for that pulse. These embodiments provide a relatively high sampling duty cycle over a wider range of mass to charge ratios.

Alternatively, the range of mass to charge ratios that is able to be transmitted by the mass filter or mass separator for the second pulse sequence may be the same as the range transmitted for the first pulse sequence.

The second pulse sequence may have the same features as the first pulse sequence, although it is contemplated that the pulse sequences may be different.

For example, the second pulse sequence may be an encoded frequent pulse sequence in which the duration between any two pulses in the second pulse sequence is different to the duration between any other two pulses in the second pulse sequence. The spectrometer may be configured to detect the ions at the detector and generate mass spectral data for those ions. The spectrometer may also be configured to decode the mass spectral data using the timings of the pulses in the encoded frequent pulsing. The spectrometer may therefore decode the mass spectral data so as to determine which mass spectral data relates to which pulse of ions.

The first reflector may be activated and deactivated so as to reflect ions from the second pulse sequence in a corresponding manner to that described above in relation to the first pulse sequence.

For example, the second pulse sequence consists of a plurality of pulses, starting a first pulse and ending with a final pulse; and the control circuitry may be configured to change the first reflector from being in the deactivated state, in which it does not reflect ions in the second dimension, to being in the activated state, in which it does reflect ions in the second dimension, at a time corresponding to the time that the lowest mass to charge ratio ion from the first pulse of the second pulse sequence would reach the first reflector for the first time after having travelled in the second dimension from one end of the ion mirrors to the other end of the ion mirrors.

The control circuitry may be configured to: maintain the first reflector activated for a period of time substantially corresponding to the time that said lowest mass to charge ratio ion from said first pulse in the second pulse sequence would take to travel an integer number n of round trips from the first reflector to the second reflector and back to the first reflector; and to deactivate the first reflector at the end of said period of time such that said lowest mass to charge ratio ion may pass to the detector.

Said integer number of round trips may be ≥1; ≥2; ≥3; ≥4; ≥5; ≥6; ≥7; ≥8; ≥9; or ≥10 round trips.

The spectrometer may have a user interface that is configured so that a user may input said integer number of round trips and the control circuitry may be configured to then control the first reflector in response thereto so as to perform the above method.

The integer number of round trips may be the same as for the first pulse sequence.

The first reflector may be deactivated when (e.g. immediately before) the lowest mass to charge ratio ion from said first pulse would reach the first reflector after having undergone said integer number of round trips.

The heaviest mass to charge ratio ion from the final pulse in the second pulse sequence must reach the first reflector whilst it is still activated in order to perform the desired number of reflections in the second dimension. As such, the control circuitry may be configured to control the ion accelerator such that the final pulse in the second pulse sequence occurs at least a time Tx before the first reflector is deactivated, wherein Tx is the time it would take the highest mass to charge ratio ion in said range of mass to charge ratios to travel from the ion accelerator to said first reflector and then travel n−1 round trips from the first reflector to the second reflector and back to the first reflector.

The first reflector may be deactivated after (e.g. immediately after) the highest mass to charge ratio ion has made said n−1 round trips and been reflected by the first reflector.

When the highest mass to charge ratio ion arrives at the first reflector the next time, the first reflector will have been deactivated and the highest mass to charge ratio ion will be able to pass to the detector.

The control circuitry may be configured to control the ion accelerator to perform the first pulse in the second pulse sequence at or less than a time Ts before the first reflector is reactivated, wherein Ts is the time it takes the lowest mass to charge ratio ion from the first pulse of the second pulse sequence would reach the first reflector for the first time after having travelled at least a distance in the second dimension that is from one end of the ion mirrors to the other end of the ion mirrors.

It is contemplated that third and optionally further pulse sequences may be performed and that the first reflector may be controlled for each of those pulse sequences in a corresponding manner to that which has been described above in relation to each of the first and second pulse sequences.

The control circuitry may be configured to apply voltage pulses to said ion accelerator in order to perform the plurality of pulses in each of the pulse sequences and also to apply voltage pulses to said ion accelerator in the time period between said pulse sequences, and to control the spectrometer to either: (i) block ions pulsed by the ion accelerator during the time period from reaching the detector; or (ii) block ions being received at the ion accelerator during the time period.

Continuing to periodically pulse the ion accelerator between the pulse sequences optimises the control of the voltages at the ion accelerator and hence may improve mass accuracy and mass resolution with which the ions are mass analysed.

The first and second reflectors may be located at or towards opposite ends of the ion mirrors, in the second dimension.

The ion accelerator may be located at the same end of the ion mirrors, in the second dimension, as the detector. In these embodiments the first reflector may be located at or towards the same end of the ion mirrors, in the second dimension, as the detector.

Alternatively, the ion accelerator may be located at the opposite end of the ion mirrors, in the second dimension, to the detector. In these embodiments the first reflector may be located at or towards the same end of the ion mirrors, in the second dimension, as the detector.

The spectrometer may comprise periodic lenses arranged between the ion mirrors such that the ion packets pass through the periodic lenses during at least some of the times that they travel from one of the ion mirrors into the other of the ion mirrors, wherein the spectrometer is configured to apply voltages to the periodic lenses so as to focus the ion packets, in the second dimension, as they pass therethrough.

This maintains the width of the ion packet in the second dimension as it travels between the mirrors. For example, the periodic lenses may refocus the ion packets to the same constant width each time they pass through a periodic lens.

One or more of the periodic lenses may be arranged between the ion accelerator and the second reflector; and/or one or more of the periodic lenses may be arranged between the first reflector and the detector.

The second reflector may be controlled to reflect ions in the second dimension throughout the analysis described above.

Alternatively, the second reflector may be activated at certain times to reflect ions in the second dimension and deactivated at other times so as to allow ions to pass the second reflector without being reflected but it. For example, when the second reflector is located at or towards the same end of the ion mirrors as the ion accelerator, the second deflector may initially be deactivated so as to enable the packets of ions from the pulse sequence to pass the second deflector without being reflected by it. Once these ions have passed the second deflector, the second deflector may be activated for reflecting ions back toward the first reflector arranged at or towards the other end of the ion mirrors.

The present invention also provides method of mass spectrometry comprising using a spectrometer as described herein to mass analyse ions.

Accordingly, the present invention provides a method of mass spectrometry comprising: providing a multi-reflecting time of flight mass analyser having an ion accelerator, ion mirrors, first and second reflectors, and an ion detector; transmitting ions having a restricted range of mass to charge ratios to the mass analyser; pulsing the ion accelerator according to a first pulse sequence so as to pulse a first plurality of packets of ions into a first of the ion mirrors such that the ions are reflected in a first dimension (x-dimension) between the ion mirrors as the ions travel in a second dimension (z-dimension); controlling the reflectors such that ions in said plurality of packets are reflected back and forth in the second dimension by the reflectors at the same time; and then deactivating the first reflector such that ions can pass to the detector; wherein the timings at which the first reflector is activated and deactivated are controlled such that substantially all of the ions from said plurality of packets of ions undergo the same number of reflections in the second dimension before being received at the detector.

It is contemplated that the ions need not be reflected between ion mirrors, but that the ions may simply be guided by ion-optics, such as an ion guide.

Additionally, or alternatively, it is contemplated that the instrument may separate the ions by a physicochemical property other than mass to charge ratio, such as ion mobility.

Accordingly, from a second aspect the present invention provides a mass or mobility spectrometer comprising: a filter or separator for filtering or separating ions according to a physicochemical; an ion accelerator for pulsing packets of ions; ion-optics arranged to guide ions along an a first dimension (z-dimension); first and second ion reflectors arranged such that when they are both activated they reflect the ions back and forth in the first dimension; an ion detector arranged to receive the ions, when a first of the ion reflectors is deactivated; and control circuitry configured to: control the ion accelerator to perform a first pulse sequence that pulses a first plurality of packets of ions into the ion-optics; control the reflectors such that ions in said plurality of packets are reflected back and forth in the first dimension by the reflectors at the same time; and control the range of values of the physicochemical property that is able to be transmitted by the filter or separator to the ion accelerator, and the timings at which the first reflector is activated and deactivated, such that substantially all of the ions from said plurality of packets of ions undergo the same number of reflections in the first dimension before being received at the detector.

The a filter or separator may be a mass filter or mass separator, or may be an ion mobility filter or ion mobility separator. For example, it may be a drift time ion mobility separator or a FAIMS device.

The ions may separate according to mass to charge ratio or ion mobility as they are reflected along the first dimension.

The second aspect of the present invention may have any of the features described herein in relation to the first aspect, except that the ions need not be reflected between ion mirrors and/or the instrument may separate the ions by a physicochemical property other than mass to charge ratio, such as ion mobility.

The present invention is not restricted to arrangements in which the ions are caused to undergo multiple passes along the device by being reflected in a dimension between reflectors. Rather, the ions may be reflected or deflected along a curved ion path or may be caused to perform multiple passes (i.e. cycles) around a closed-loop ion path. For example, the closed-loop ion path may be a circular, oval, rectangular, or square shaped ion path. Alternatively, the closed-loop ion path may be a serpentine, tortuous or contorted ion path. The ions may be ejected from such an ion path by a reflector or deflector.

Accordingly, from a third aspect the present invention provides a mass or mobility spectrometer comprising: a filter or separator for filtering or separating ions according to a physicochemical; an ion accelerator for pulsing packets of ions; ion optics arranged to receive the ions from the ion accelerator and guide them along an ion path; at least one ion deflector or reflector operable in a first mode so as to allow or cause ions to remain on said ion path and a second mode so as to allow or cause ions to be ejected from the ion path; and control circuitry configured to: control the ion accelerator to perform a first pulse sequence that pulses a first plurality of packets of ions into the ion optics and along said ion path such that ions in said plurality of packets travel along, or around, the ion path at the same time; and control the range of values of the physicochemical property that is able to be transmitted by the physicochemical filter or separator to the ion accelerator, and the timings at which the at least one deflector or reflector is operated in the first and second modes, such that substantially all of the ions from said plurality of packets of ions undergo the same number of passes along or around the ion path before being ejected from the ion path.

The analyser may comprise an ion detector arranged to receive the ions, when ejected from the ion path.

The ion-optics may be a closed loop ion guide that defines said ion path as a closed-loop ion path.

The third aspect of the present invention may have any of the features described herein in relation to the first or second aspects, except that the ions need not be reflected between ion mirrors and/or the instrument may separate the ions by a physicochemical property other than mass to charge ratio, such as ion mobility.

For example, the filter or separator may be a mass to charge ratio filter or mass to charge ratio separator, or may be an ion mobility filter or ion mobility separator. For example, it may be a drift time ion mobility separator or a FAIMS device.

The ions may separate according to mass to charge ratio or ion mobility as they travel along the ion path.

BRIEF DESCRIPTION OF THE DRAWINGS

Various embodiments of the present invention will now be described, by way of example only, and with reference to the accompanying drawings in which.

DETAILED DESCRIPTION

Figure 1:
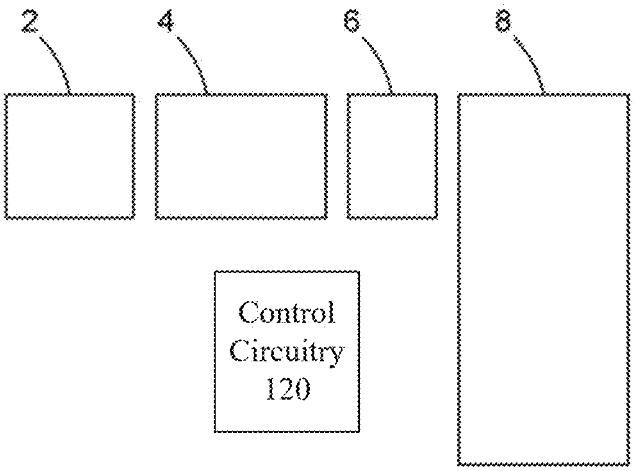
FIG. 1 shows a schematic of an embodiment of a mass spectrometer according to an embodiment of the present invention.

FIG. 1 shows a schematic of an embodiment of a mass spectrometer according to an embodiment of the present invention. The spectrometer comprises an ion source 2, a fragmentation or reaction device 4, a quadrupole mass filter 6 and a multi-reflecting time of flight (MRTOF) mass analyser 8. It will be appreciated that other ion-optical devices may also be provided, although these are omitted for brevity.

In operation, ions are generated by ion source 2 and pass to the fragmentation or reaction device 4. The fragmentation or reaction device 4 may be operated in a first mode so as to fragment or react the ions so as to produce fragment or product ions that are then transmitted downstream to the mass filter 6. Alternatively, the fragmentation or reaction device 4 may not fragment or react the ions and may instead simply transmit the ions downstream to the mass filter 6. RF and DC voltages are applied to the mass filter 6 such that it is only capable of transmitting a selected range of mass to charge ratios. The ions exiting the mass filter then then pass into the MRTOF mass analyser 8. Control circuitry 120 may be configured to operate ion accelerators, reflectors, and/or mass filters described herein.

Figure 2:
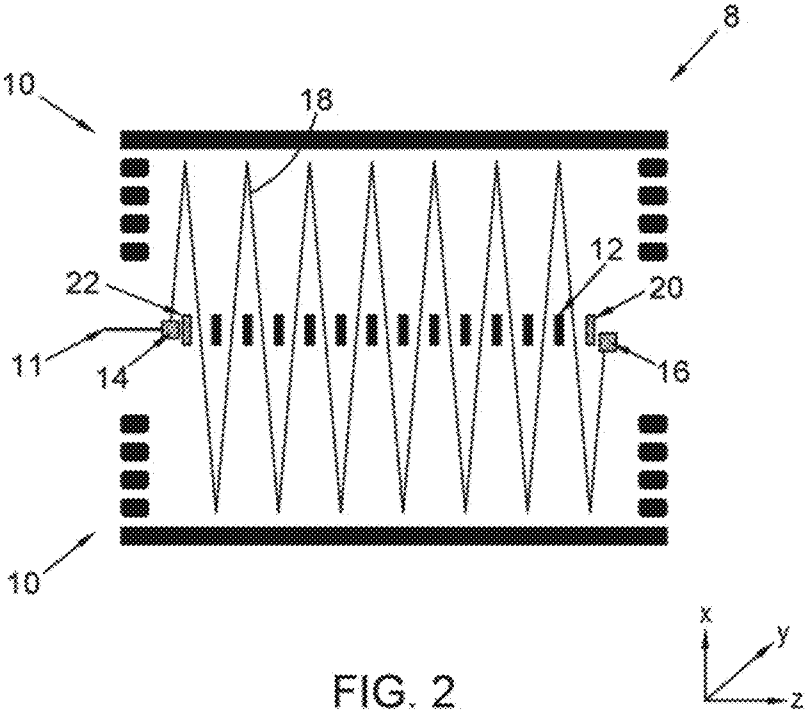
FIG. 2 shows a MRTOF mass analyser according to an embodiment of the present invention, when being operated such that ions pass from one end to the other only a single time.

FIG. 2 shows a MRTOF mass analyser 8 according to an embodiment of the present invention, when being operated such that ions pass from one end to the other only a single time. The mass analyser comprises two ion mirrors 10 that are separated in the x-dimension by a field-free region. Each ion mirror 10 comprises multiple electrodes for reflecting ions in the x-dimension, and is elongated in the z-dimension. An array of periodic lenses 12 may be arranged in the field-free region between the ion mirrors 10. An orthogonal accelerator 14 is arranged at a first end of the analyser for accelerating packets of ions from an ion beam into one of the ion mirrors. An ion detector 16 is also arranged at a second end of the analyser that is opposite to the first end (in the z-dimension).

In use, a beam of ions 11 passes to the orthogonal accelerator 14, which pulses a packet of ions into a first of the ion mirrors 10. The ions in the packet of ions therefore have a velocity in the x-dimension due to the orthogonal accelerator 14. These ions also have a drift velocity in the z-dimension, either due to their direction of travel in the z-dimension when entering the orthogonal accelerator 14 or because it is imparted to them in the mass analyser 8. The ions enter into the first ion mirror and are reflected back towards the second of the ion mirrors. The ions then enter the second mirror and are reflected back to the first ion mirror. The first ion mirror then reflects the ions back to the second ion mirror. This continues and the ions are continually reflected between the two ion mirrors 10 as they drift along the mass analyser in the z-dimension, from the first end towards the second end, until the ions strike the detector 16. The ions therefore follow a substantially sinusoidal mean trajectory 18 within the x-z plane between the orthogonal accelerator 14 and the ion detector 16. The ion detector 16 is then able to determine the mass spectral for the ions in the packet of ions that was pulsed into the mass analyser 8. It will be appreciated that the number of ion mirror reflections that the ions undergo as they pass from the first end to the second end is not limited to the number shown in FIG. 2, and if a periodic lens array 12 is provided then it may be arranged to match the flight path dictated by the number of mirror reflections.

The periodic lens array 12 is arranged such that the ions pass through the lenses as they are reflected between the ion mirrors 10. Voltages are applied to the electrodes of the lenses 12 so as to spatially focus the ion packets in the z-dimension. This prevents the ions diverging excessively in the z-dimension so as to ensure that all of the ions that arrive at the detector 16 have undergone the same number of mirror reflections. The periodic lens array 12 therefore prevents ions having significantly different flight path lengths through the mass analyser 8 on the way to the detector 16.

The mass analyser 8 also has a first ion reflector 20 at the second end of the mass analyser and a second ion reflector 22 arranged at the first end of the mass analyser, although in the mode shown in FIG. 2 these are deactivated.

Figure 3:
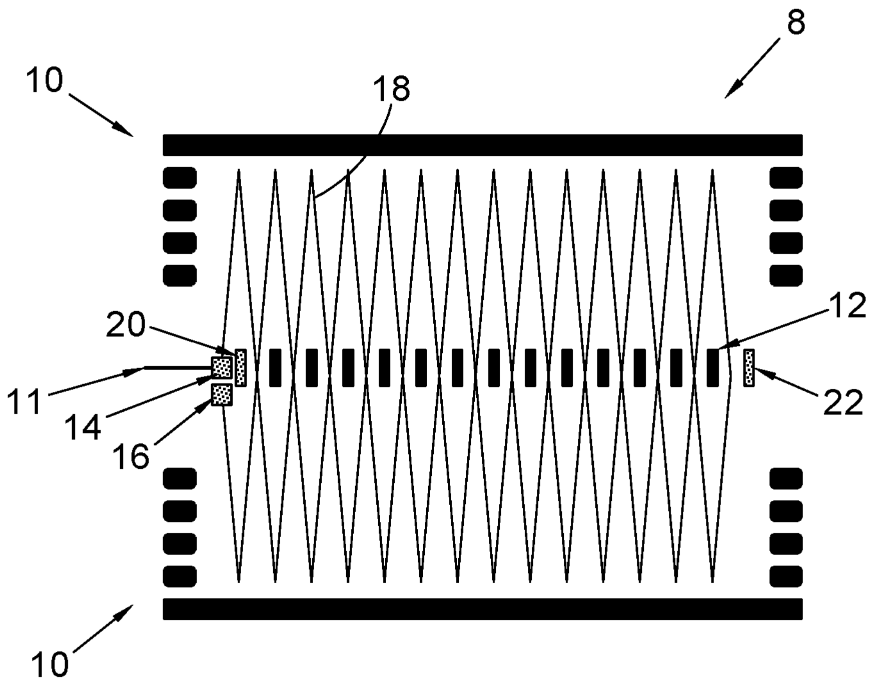
FIG. 3 shows a MRTOF mass analyser according to another embodiment of the present invention having an ion detector at the same end as the orthogonal accelerator, and when being operated in multi-pass or Zoom mode.

FIG. 3 shows a MRTOF mass analyser 8 according to an embodiment of the present invention that is substantially the same as that shown in FIG. 2, except that it has an ion detector 16 at the same end as the orthogonal accelerator 14 and is being operated in multi-pass or Zoom mode. The mass analyser also includes a first ion reflector 20 at the first end of the mass analyser and a second ion reflector 22 arranged at the second end of the mass analyser.

In use, the mass filter 6 delivers a beam of ions having a restricted range of mass to charge ratios to the orthogonal accelerator 14, which pulses a packet of ions into a first of the ion mirrors 10. The ions in the packet of ions therefore have a velocity in the x-dimension due to the orthogonal accelerator 14. These ions also have a drift velocity in the z-dimension, either due to their direction of travel in the z-dimension when entering the orthogonal accelerator 14 or because it is imparted to them in the mass analyser 8. The ions enter into the first ion mirror and are reflected back towards the second of the ion mirrors. The ions then enter the second mirror and are reflected back to the first ion mirror. The first ion mirror then reflects the ions back to the second ion mirror. This continues and the ions are continually reflected between the two ion mirrors 10 as they drift along the mass analyser in the z-dimension, from the first end towards the second end. The ions therefore follow a substantially sinusoidal mean trajectory 18 within the x-z plane between the ion source and the ion detector 16. It will be appreciated that the number of ion mirror reflections that the ions undergo as they pass from the first to the second end is not limited to the number shown in FIG. 3. The ions are reflected at the second end of the mass analyser by the second reflector 22 such that the ions subsequently drift along the mass analyser in the z-dimension, from the second end back towards the first end. The ions continue to be reflected between the ion mirrors in the above-described manner as they drift from the second end back towards the first end.

When the ions have drifted back to the first end, the first reflector 20 may not be activated (i.e. it may be in a deactivated state) so as to allow the ions to impact upon ion detector 16. The ion detector 16 is then able to determine the mass spectral data for the ions in the packet of ions that was pulsed into the mass analyser 8. Alternatively, if it is desired that the ions undergo a longer ion flight path before detection (e.g. to obtain a higher mass resolution), then the first ion reflector 20 may be activated so as to reflect the ions back towards the second end of the mass analyser 8, rather than allowing the ions to reach the detector 16. The ions that are reflected by the first reflector 20 subsequently drift along the mass analyser in the z-dimension, from the first end back towards the second end. The ions continue to be reflected between the ion mirrors 10 in the above-described manner as they drift from the first end back towards the second end. The ions are then reflected at the second end of the mass analyser 8 by the second reflector 22 such that the ions subsequently drift along the mass analyser in the z-dimension, from the second end back towards the first end. The ions continue to be reflected between the ion mirrors 10 in the above-described manner as they drift from the second end back towards the first end. When the ions have drifted back to the first end, the first reflector 20 may be in a deactivated state so as to allow the ions to impact upon ion detector 16. Alternatively, if a still longer ion flight path is desired then the first reflector 20 may be maintained in an active state so as to reflect the ions back towards the second end of the mass analyser another time and consequently the second ion reflector 22 will reflect these ions back to the first end again. The first reflector 20 may then be deactivated so as to allow the ions to impact upon the ion detector 16, or the process of reflecting the ions back and forth between the first and second ends may be repeated any number of times before the ions are allowed to strike the detector 16.

In other words, the first and second ion reflectors 20, 22 are controlled so as to trap the ions such that they oscillate back and forth in the z-dimension until the ions have undergone the desired flight path length, at which point the first reflector 20 is controlled such that the ions are able to pass to the detector 16. In contrast, the second reflector 22 may be continuously operated in a reflecting mode so as to reflect ions back towards the first end. It will be appreciated that the first and second reflectors 20, 22 may each comprise one or more electrodes and that the spectrometer may comprise control circuitry configured to apply voltages to these electrodes such that the reflectors 20, 22 perform the functions described herein. For example, one or more voltage may be applied to the second reflector 22 so as to cause the ions to be reflected in the z-dimension back towards the first end. One or more voltages may be applied to the first reflector 20 when it is desired to reflect ions in the z-dimension back towards the second end. Another voltage, or no voltage, may be applied to the first reflector 20 when it is desired for ions not to be reflected in the z-dimension but for the ions to instead pass to the detector 16.

The periodic lens array 12 is arranged such that the ions pass through the lenses as they are reflected between the ion mirrors 10. Voltages are applied to the electrodes of the lenses 12 so as to spatially focus the ion packets in the z-dimension. This prevents the ions diverging excessively in the z-dimension so as to ensure that the ions that all of the ions that arrive at the detector 16 have undergone the same number of mirror reflections. The periodic lens array 12 therefore prevents ions have significantly different flight path lengths through the mass analyser 8 on the way to the detector 16.

As described above, TOF mass analysers pulse a plurality of packets of ions into the ion mirrors during a single experimental run. It is desired to perform these pulses at a relatively high rate, in order to analyse a relatively large proportion of the sample transmitted to the mass analyser, i.e. to achieve a relatively high sampling duty cycle. However, in conventional multi-pass modes (a.k.a. Zoom modes) this pulse rate has been limited because the mass analyser must be configured to wait until the heaviest mass to charge ratio of interest in any given pulse has reached the detector before the next packet of ions is pulsed into the mirrors. If this is not done, then when the first reflector 20 is controlled so as to allow ions from a first pulse to arrive at the detector 16 (once these ions have been reflected the desired number of times in the z-dimension), relatively fast and low mass to charge ratio ions from a second subsequent pulse may also pass to the detector instead of being reflected back in the z-dimension. It will be appreciated that this must be prevented, otherwise ions from different pulses will perform different numbers of reflections in the z-dimension and will therefore have significantly different flight path lengths to the detector.

The inventors of the present invention have recognised that by restricting the range of mass to charge ratios that is transmitted to the mass analyser, the reflectors can be controllably activated and deactivated so as to ensure that even when multiple packets of ions are pulsed into the ion mirrors in overlapping time periods, substantially all of the ions in the different ion packets undergo the same number of reflections in the z-dimension.

Figure 4:
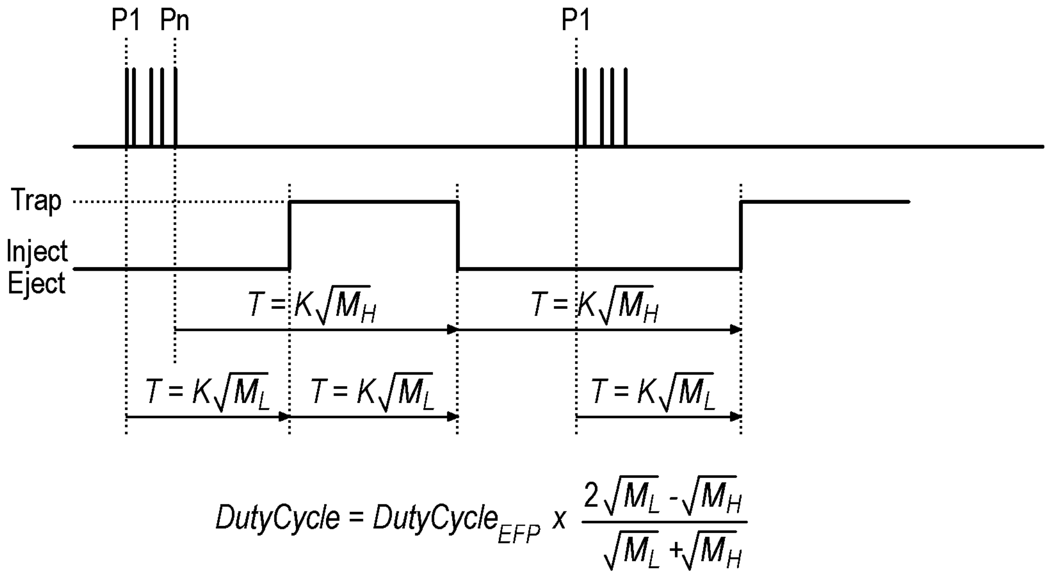
FIG. 4 shows a pulse timing diagram illustrating how the pulses of the ion accelerator and the trapping caused by the first reflector may be controlled for a multi-pass mode embodiment according to FIG. 3, wherein the ions perform two round trips along the mass analyser between being pulsed by the ion accelerator and being detected at the detector.

FIG. 4 shows a pulse timing diagram illustrating how the timings of the pulses of the ion accelerator 14 and the trapping caused by the first reflector 20 may be controlled for a multi-pass mode embodiment according to FIG. 3. In the embodiment of FIG. 4, the ions in each ion packet are caused to pass from the first end to the second end, be reflected in the z-dimension by the second reflector 22 back to the first end, be reflected in the z-dimension by the first reflector 20 back to the second end, be reflected in the z-dimension by the second reflector 22 back to the first end, and then be allowed to reach the detector 16. In other words, the ions from each pulse traverse the length of the mass analyser in the z-dimension four times and then strike the detector 16.

The ion accelerator 14 is controlled to perform multiple sequential pulse sequences, wherein each pulse sequence consists of a plurality of sequential pulses P1 to Pn that pulse a respective plurality of packets of ions into the mass analyser 8. Although each pulse sequence is illustrated as consisting of five pulses P1-Pn, it will be appreciated that the pulse sequence may comprise a different number of pulses. A first packet of ions is pulsed into the mass analyser at a first time by pulse P1 and these ions begin to separate according to mass to charge ratio as they travel towards the detector 16. As will be appreciated, ions having the lowest mass to charge ratio travel the fastest, whilst ions having the highest mass to charge ratio travel the slowest. Therefore, the lightest ions will be reflected by the second reflector 22 and arrive at the first end of the mass analyser first. Ions having the lowest mass to charge in each pulse (i.e. the lowest mass to charge ratio of the restricted range transmitted by the mass filter) may be defined as having mass to charge ratio $M_L$, whereas the ions having the highest mass to charge ratio in each pulse (i.e. the highest mass to charge ratio of the restricted range transmitted by the mass filter) may be defined as having mass to charge ratio $M_H$. When ions having mass to charge ratio $M_L$ arrive at the first reflector 20, the first reflector 20 must be activated so as to reflect these ions back towards the second end. This is illustrated in FIG. 4, where it can be seen that the trapping electrical potential applied to the first reflector 20 is increased at time T=K.SQRT($M_L$) after the first pulse P1, where K is a constant. As will be appreciated, this expression for T is derived from the distance the ion travels divided by the velocity of the ion, where the velocity is determined from the kinetic energy imparted to the ion by the voltage pulse of ion accelerator 14.

The lightest ions of interest $M_L$ are therefore reflected back towards the second end, where they are reflected back towards the first end by the second reflector 22. As the second reflector 22 is always in a reflecting mode, in this embodiment, the timing diagram of the trapping voltage applied to the second reflector 22 is not shown in FIG. 4. The lightest ions of interest then reach the first reflector 20 again, at which time it is desired to allow these ions to pass to the detector 16. As such, the first reflector 20 must be deactivated at this time and so the trapping electrical potential applied to the first reflector 20 is decreased at time T=K.SQRT($M_L$) after it was increased.

All ions that arrive at the first reflector 20 in the time period that it is activated, i.e. between times T and 2T after pulse time P1, will be reflected in the z-dimension, whereas ions that arrive at the first reflector 20 after time 2T from the first pulse P1 will not be reflected. The heaviest mass to charge ratio of interest $M_H$ in the final pulse Pn of a given pulse sequence must therefore reach the first reflector 20 whilst the first reflector 20 is still activated (i.e. by 2T from the first pulse P1). Accordingly, the timing of the final pulse Pn in a pulse sequence is restricted to being at least time T=K.SQRT($M_H$) before the first reflector 20 is deactivated.

The ions that are reflected by the first reflector 20 pass back towards the second end, where they are reflected back towards the first end by the second reflector 22. These ions will next arrive at the first end when the first reflector 20 is deactivated and so will pass to the detector 16.

Therefore, the above timings ensure that each of the ions pulsed into the mass analyser travels four, and only four, lengths of the mass analyser. The pulses in each pulse sequence may be pulsed according to an Encoded Frequent Pulsing (EFP) technique such that the duration between any pair of pulses in the sequence is different to the duration between any other pair of pulses within the sequence. Although ions of interest from different pulses will arrive at the detector 16 in overlapping time periods, the mass analyser is able to decode the resulting mass spectral data so as to determine which mass spectral data relates to which pulse by using the timings of the pulses P1-Pn in the EFP sequence.

The above process may be repeated for a second, subsequent pulse sequence P1-Pn, in which the mass analyser will control the times at which the first reflector 20 is active relative to the pulses of the second pulse sequence in a corresponding manner to that described above. The second pulse sequence may be the same pulse sequence to the first pulse sequence or may be a different EFP pulse sequence. The first reflector 20 must remain deactivated (to allow ions to reach the detector 16) until all ions of interest from the first pulse sequence have completed four lengths of the mass analyser and reached the detector 16. As such, the first reflector 20 cannot be reactivated in order to reflect ions from the second pulse sequence until at least T=K.SQRT ($M_H$) after the time that it was deactivated. This deactivated time period is required in order to allow the heaviest ions of interest from the final pulse of the first pulse sequence (that were reflected by the first reflector 20) to travel to the second reflector 22 and be reflected back to the detector 16. If the first reflector 20 was active in this time period then some of these ions may not reach the detector 16.

As described above, the first reflector 20 must be activated by time K.SQRT($M_L$) after the first pulse in a pulse sequence in order to reflect the lightest ions of interest $M_L$ in that pulse. Therefore, the timing of the first pulse in the second pulse sequence is at a time K.SQRT($M_L$) before the first reflector 20 is activated for the second time.

It will be appreciated that third and further pulse sequences (not shown) may be performed during the experimental run and that the first reflector 20 may be controlled in a corresponding manner for each of those pulse sequences.

Although FIG. 4 shows the pulse sequences being separated by relatively large periods of times in which there are no pulses, it is contemplated that the ion accelerator 14 may also be pulsed in between these pulse sequences but that the ions from these pulses are not permitted to reach the detector, e.g. by deflecting these ions such that they do not reach the detector. Pulsing the orthogonal accelerator relatively regularly throughout the analysis time in this manner helps enable the voltages applied to the orthogonal accelerator electrodes be controlled more easily and accurately and hence results in the mass analyser analysing ions with improved mass accuracy and mass resolution.

FIG. 4 also shows the sampling duty cycle of this embodiment compared to the sampling duty cycle of the mass analyser (operated in an EFP mode) when not operated in a Zoom mode, i.e. when the ions travel only one length of the analyser as shown in FIG. 2. For example, when analysing analytes such as lipids, the mass filter 6 may be controlled so as to only transmit ions having a mass to charge ratio range such that $M_L$=700 and =$M_H$ 900. In such a method the sampling duty cycle would be approximately 40% of the underlying non-Zoom mode sampling duty cycle, which is relatively high for a Zoom mode.

A Zoom mode has been described in which the ions make two round-trips along the length of the mass analyser, in the Z-dimension, between being pulsed and being detected. However, it is contemplated that the first reflector 20 may be controlled such that the ions are caused to undergo a greater number of round trips between being pulsed by the ion accelerator and being detected at the detector.

Figure 5:
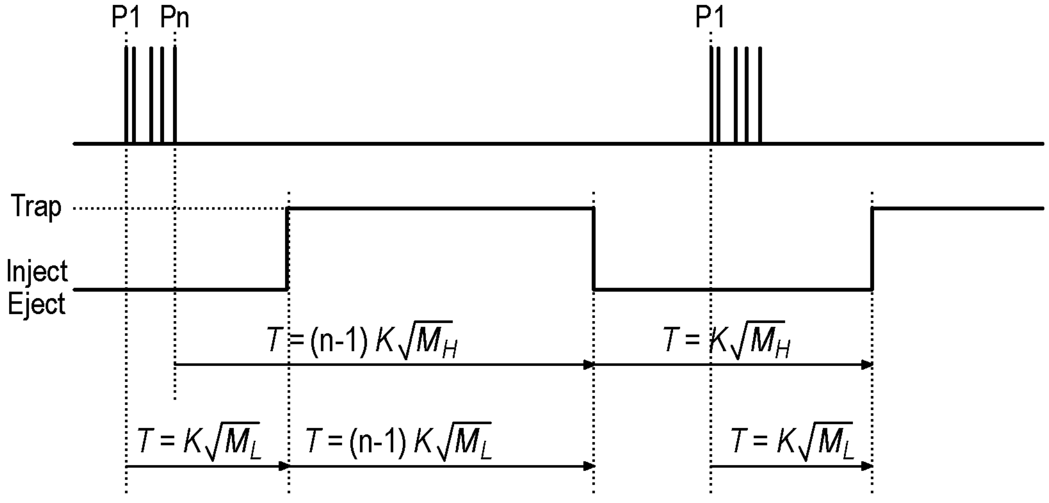
FIG. 5 shows a pulse timing diagram similar to FIG. 4, except wherein the ions perform an integer number of n round trips along the mass analyser between being pulsed by the ion accelerator and being detected at the detector.

FIG. 5 shows a pulse timing diagram illustrating how the timings of the pulses of the ion accelerator 14 and the trapping caused by the first reflector 20 may be controlled for a Zoom mode embodiment that is the same as in FIG. 3, except in which the ions perform n round trips along the z-dimension of the mass analyser between being pulsed by the ion accelerator and being detected at the detector, where n≥2. These embodiments function in the same manner as described above in relation to FIG. 4, except that the duration that the first reflector 20 remains activated and in a trapping mode is T=(n−1) K.SQRT($M_L$). For modes in which n>2 this duration is extended relative to that of FIG. 4 in order to ensure that the lightest ions of interest $M_L$ are reflected at the first reflector 20 a sufficient number of times such that these ions perform n round trips along the z-dimension before being detected at detector 16. The duration between the final pulse Pn in a pulse sequence and the time at which the first reflector 20 is deactivated so as to no longer reflect ions from that pulse sequence is given by T=(n−1) K.SQRT($M_H$). For modes in which n>2 this duration is extended relative to that of FIG. 4. The other timings show are the same as in FIG. 4.

FIG. 5 also shows the sampling duty cycle for n>2, as compared to the sampling duty cycle of the mass analyser (operated in an EFP mode) when not operated in a Zoom mode, i.e. when the ions travel only one length of the analyser as shown in FIG. 2.

Figure 6:
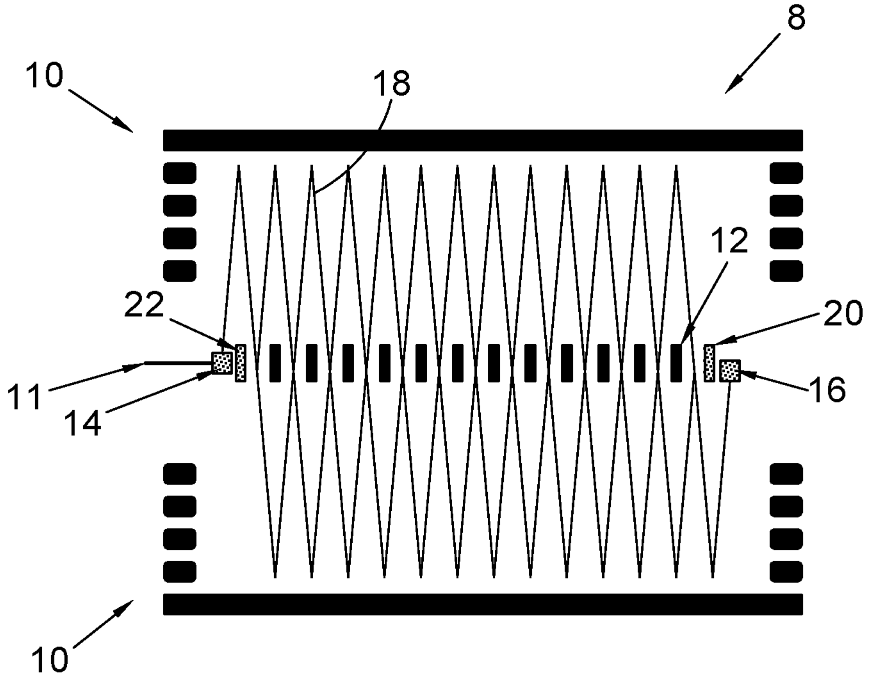
FIG. 6 shows a MRTOF mass analyser according to the embodiment of FIG. 2, except operated in a Zoom mode.

FIG. 6 shows a MRTOF mass analyser according to the embodiment of FIG. 2, except operated in a Zoom mode. In use, the mass filter 6 delivers the beam of ions having the restricted range of mass to charge ratios to the orthogonal accelerator 14, which pulses a packet of ions into a first of the ion mirrors 10. These ions are continually reflected between the two ion mirrors 10 as they drift along the mass analyser in the z-dimension, from the first end towards the second end. The ions are reflected at the second end of the mass analyser by a first reflector 20 such that the ions subsequently drift along the mass analyser in the z-dimension, from the second end back towards the first end. The ions continue to be reflected between the ion mirrors 10 in the above-described manner as they drift from the second end back towards the first end. The ions are reflected at the first end of the mass analyser by the second reflector 22 such that the ions subsequently drift along the mass analyser in the z-dimension, from the first end back towards the second end. The ions continue to be reflected between the ion mirrors 10 in the above-described manner as they drift from the first end back towards the second end.

When the ions have drifted back to the second end, the first reflector 20 may be controlled so as to allow the ions to impact upon ion detector 16. The ion detector 16 is then able to determine the mass spectral data for the ions in the packet of ions that was pulsed into the ion mirrors 10. Alternatively, if it is desired that the ions undergo a longer ion flight path before detection (e.g. to obtain a higher mass resolution), then the first ion reflector 20 may be activated so as to reflect the ions back towards the first end of the mass analyser, rather than allowing the ions to reach the detector 16. The ions that are reflected by the first reflector 20 subsequently drift along the mass analyser in the z-dimension, from the second end back towards the first end. The ions continue to be reflected between the ion mirrors 10 in the above-described manner as they drift from the second end back towards the first end. The ions are then reflected at the first end of the mass analyser by the second reflector 22 such that the ions subsequently drift along the mass analyser in the z-dimension, from the first end back towards the second end. The ions continue to be reflected between the ion mirrors 10 in the above-described manner as they drift from the first end back towards the second end. When the ions have drifted back to the second end, the first reflector 20 may be deactivated so as to allow the ions to impact upon ion detector 16. Alternatively, if a still longer ion flight path is desired then the first ion reflector 20 may be controlled to reflect the ions back towards the first end of the mass analyser another time and subsequently the second ion reflector 22 will reflect these ions back to the second end again. The first reflector 20 may then be controlled so as to allow the ions to impact upon the ion detector 16, or the process of reflecting the ions back and forth between the first and second ends may be repeated any number of times before the ions are allowed to strike the detector 16.

In other words, the first and second ion reflectors 20, 22 are controlled so as to trap the ions such that they oscillate back and forth in the z-dimension until the ions have undergone the desired flight path length, at which point the first reflector 20 is controlled such that the ions are able to pass to the detector 16. In contrast, the second reflector 22 may be continuously operated in a reflecting mode so as to reflect ions back towards the first end.

Figure 7:
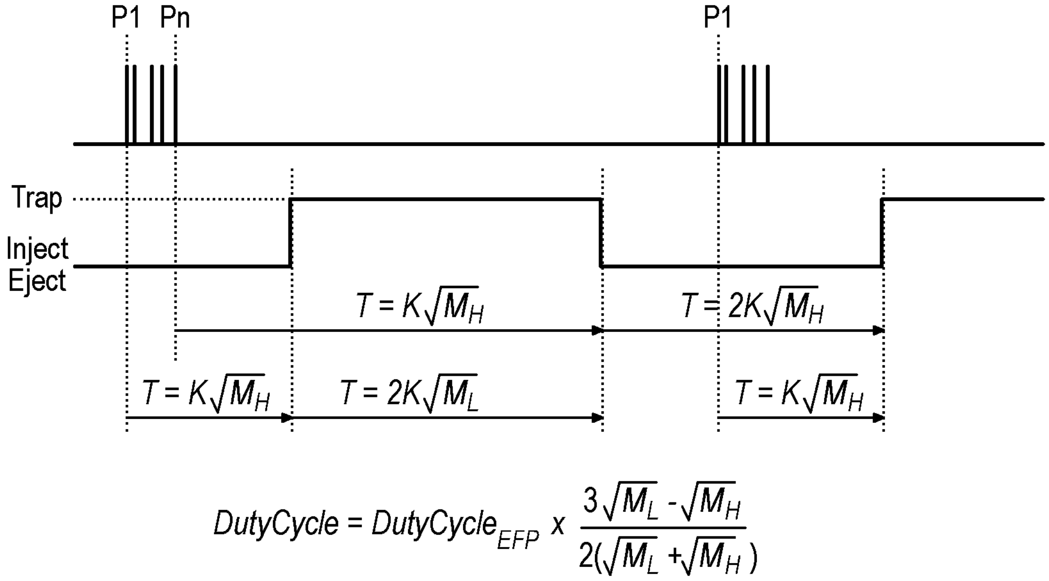
FIG. 7 shows a pulse timing diagram illustrating how the pulses of the ion accelerator and the trapping caused by the first reflector may be controlled for a multi-pass mode embodiment according to FIG. 6.

FIG. 7 shows a pulse timing diagram illustrating how the timings of the pulses of the ion accelerator 14 and the trapping caused by the first reflector 20 may be controlled for a Zoom mode embodiment according to FIG. 6. In the embodiment of FIG. 7, the ions in each ion packet are caused to pass from the first end to the second end, be reflected in the z-dimension by the first reflector 20 back to the first end, be reflected in the z-dimension by the second reflector 22 back to the second end, and then be allowed to reach the detector 16. In other words, the ions from each pulse traverse the length of the mass analyser in the z-dimension three times and then strike the detector 16.

The timing sequence in FIG. 7 corresponds to that shown in FIG. 4, except controlled such that the ions traverse the length of the mass analyser in the z-dimension only three times and then strike the detector 16. When ions from pulse P1 (in the first pulse sequence) having mass to charge ratio $M_L$ arrive at the first reflector 20, the first reflector 20 must be activated so as to reflect these ions back towards the first end. This is illustrated in FIG. 7, where it can be seen that the trapping electrical potential applied to the first reflector 20 is increased at time T after the first pulse P1, where T=K.SQRT($M_L$). The lightest ions of interest $M_L$ are therefore reflected back towards the first end, where they are reflected back towards the second end by the second reflector 22. The timing diagram of the trapping voltage applied to the second reflector 22 is not shown in FIG. 7. The lightest ions of interest $M_L$ then reach the first reflector 20 again, at which time it is desired to allow these ions to pass to the detector 16. As such, the first reflector 20 must be deactivated at this time and so the trapping electrical potential applied to the first reflector 20 is decreased at time T=2K.SQRT($M_L$) after it was increased, i.e. the first reflector 20 is deactivated after the lightest ions of interest $M_L$ have travelled three lengths along the mass analyser.

All ions that arrive at the first reflector 20 in the time period that it is activated, i.e. between T and 2T after pulse time P1, will be reflected in the z-dimension, whereas ions that arrive at the first reflector 20 after time 2T from the first pulse P1 will not be reflected. The heaviest mass to charge ratio of interest $M_H$ in the final pulse Pn of a given pulse sequence must therefore reach the first reflector 20 whilst the first reflector 20 is still activated (i.e. by 2T from the first pulse P1). Accordingly, the timing of the final pulse Pn in a pulse sequence is restricted to being at least time T=K.SQRT($M_H$) before the first reflector 20 is deactivated.

The ions that are reflected by the first reflector 20 pass back towards the first end, where they are reflected back towards the second end by the second reflector 22. These ions will next arrive at the second end when the first reflector 20 is deactivated and so will pass to the detector 16.

Therefore, the above timings ensure that each of the ions pulsed into the ion mirrors travel three, and only three, lengths of the mass analyser. The pulses in each pulse sequence are pulsed according to an Encoded Frequent Pulsing (EFP) technique such that the duration between any pair of pulses in the sequence is different to the duration between any other pair of pulses within the sequence. Although ions from different pulses will arrive at the detector in overlapping time periods, the mass analyser is able to decode the resulting mass spectral data so as to determine which mass spectral data relates to which pulse by using the timings of the pulses P1-Pn in the EFP sequence.

The above process may be repeated for a second, subsequent pulse sequence P1-Pn, in which the mass analyser will control the first reflector 20 trapping times relative to the pulses of the second pulse sequence in a corresponding manner to that described above. The second pulse sequence may be the same sequence or different to the first pulse sequence. The first reflector 20 must remain deactivated (to allow ions to reach the detector) until all ions of interest from the first pulse sequence have completed three lengths of the mass analyser and reached the detector 16. As such, the first reflector 20 cannot be reactivated in order to reflect ions from the second pulse sequence until at least T=2K.SQRT($M_H$) after the time that it was deactivated. This deactivated time period is required in order to allow the heaviest ions from the final pulse of the first pulse sequence to travel to the detector 16. If the first reflector 20 was active in this time period then some of these ions may not reach the detector 16.

As described above, the first reflector 20 must be activated by time K.SQRT($M_L$) after the first pulse in a pulse sequence in order to reflect the lightest ions of interest $M_L$ in that pulse. Therefore, the timing of the first pulse in the second pulse sequence is at a time K.SQRT($M_L$) before the first reflector is activated for the second time.

It will be appreciated that third and further pulse sequences (not shown) may be performed during the experimental run and that the first reflector 20 may be controlled in a corresponding manner for each of those pulse sequences.

FIG. 7 also shows the sampling duty cycle of this embodiment compared to the sampling duty cycle of the mass analyser (operated in an EFP mode) when not operated in a Zoom mode, i.e. when the ions travel only one length of the analyser as shown in FIG. 2.

It is contemplated that the second reflector 22 may also be activated and deactivated at different times during the mass analysis. For example, it may be desired for the second reflector 22 to be at a first voltage (e.g. zero volts) when ions are being pulsed into the ion mirrors by the ion accelerator 14, but for the second reflector to be at a second, different voltage when ions are to be reflected back in the z-dimension towards the second end.

Figure 8:
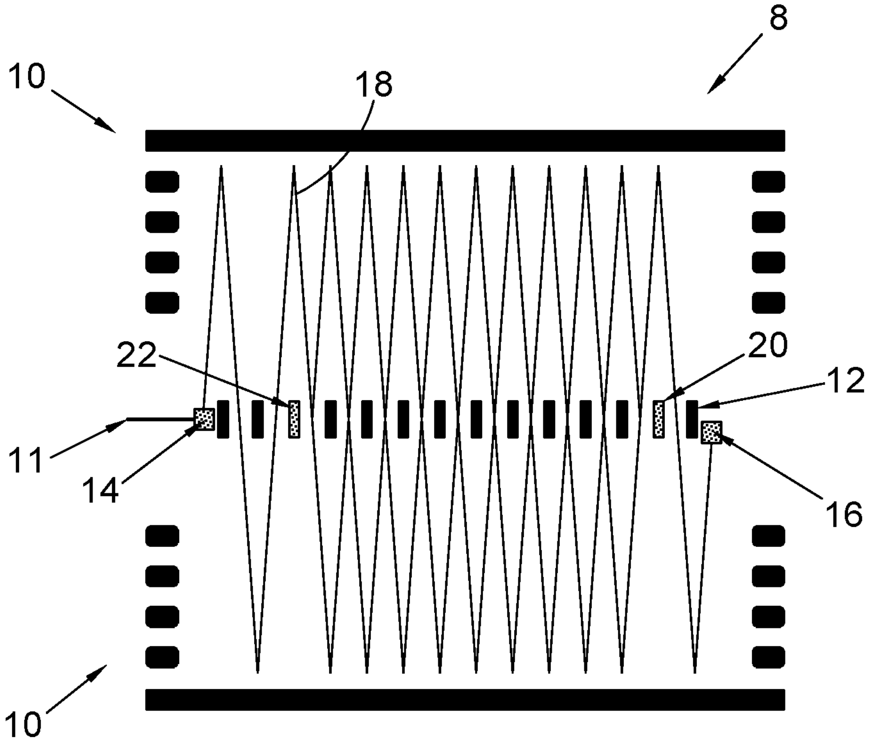
FIG. 8 shows an embodiment that is the same as that shown and described in relation to FIG. 6, except that the second reflector is arranged between the ion accelerator and the detector at a location such that ions pulsed into the mass analyser by the ion accelerator are reflected one or more times in the ion mirrors before they arrive at the second reflector.

FIG. 8 shows an embodiment that is the same as that shown and described in relation to FIG. 6, except that the second reflector 22 is arranged between the ion accelerator 14 and the detector 16 (in the z-dimension) at a location such that ions pulsed into the mass analyser by the ion accelerator 14 are reflected one or more times in the ion mirrors 10 before they arrive at the second reflector 22. For example, one or more of the periodic lenses 14 may be arranged between the ion accelerator 14 and the second reflector 22. This arrangement of the second reflector 22 may be advantageous since it allows the second reflector 22 to be operated in the trapping mode so as to reflect ions, without the trapping voltage on the second reflector 22 affecting the ions that are being pulsed into the mass analyser by the ion accelerator 14.

Although the present invention has been described with reference to preferred embodiments, it will be understood by those skilled in the art that various changes in form and detail may be made without departing from the scope of the invention as set forth in the accompanying claims.

For example, although the mass filter has been described as a quadrupole mass filter, it is contemplated that alternative types of mass filters or mass separators may be used instead. For example, a mass separator may be used that pulses ions into a time of flight region in which ions separate according to mass to charge ratio and an ion gate may be located at the end of the time of flight region which opens only for a duration of time so as to transmit the desired range of mass to charge ratios. Alternatively, a mass selective ion trap may be used to transmit the desired range of mass to charge ratios to the mass analyser.

Embodiments have been described in which the mass filter (or a mass separator) transmits the same restricted range of mass to charge ratios to the MRTOF mass analyser to be analysed in the multiple pulse sequences that occur during a single experimental run. However, it is alternatively contemplated that different ranges of mass to charge ratios may be transmitted by the mass filter (or mass separator) to be analysed by different respective pulse sequences that occur during a single experimental run. The timings of the pulses in any given pulse sequence, and the timings that the reflectors are activated and deactivated in order to analyse the ions from those pulses, will be selected based on the range of mass to charge ratios that is transmitted by the mas filter (or mass separator), as described herein. These embodiments provide a relatively high sampling duty cycle over a wider range of mass to charge ratios.

The mass spectrometer may operate in an Enhanced Duty Cycle mode, in which the ions of the restricted range of mass to charge ratios are trapped in an ion trap upstream of the ion accelerator. These ions are pulsed out of the ion trap and into the ion accelerator at times that are synchronised with the timings of the pulses in each pulse sequence, such that the ions of the restricted range of mass to charge ratios arrive in the ion accelerator at the same time that each pulse in the pulse sequence occurs. This increases the duty cycle of the instrument still further, since ions are trapped rather than being lost in between ion accelerator pulses.

Embodiments have been described in which the ion accelerator is controlled to perform multiple sequential pulse sequences, where each pulse sequence consists of a plurality of sequential pushes P1 to Pn. In practice, starting and stopping the sequential pushes like this can lead to voltage stability issues, which can ultimately affect the mass accuracy and resolution of the instrument. In order to reduce or avoid these effects, each sequence of the sequential pushes may be extended beyond push Pn up to the push P1 of the following sequence, whilst attenuating ion packets associated with pushes between Pn and P1, thereby improving the voltage stabilities. The attenuating of the ion packets can be done in the ion accelerator or TOF mass analyser (i.e. after ion extraction) or upstream of the TOF mass analyser such as in the ion transfer optics that transfer ions into the TOF mass analyser (i.e. before extraction).

Although embodiments have been described in which the ions are reflected so as to perform multiple passes along an MRTOF mass analyser, the present invention also extends to other types of separator in which multiple pulses of ions are caused to simultaneously undergo multiple passes along an ion path. For example, the present invention extends to cyclic ion mobility separators that cause ions to undergo multiple cycles around a closed-loop ion guide, separating according to their mobility as they do so.

The invention claimed is:

1. A multi-reflecting time of flight mass spectrometer comprising:

a mass filter or mass separator;

an ion accelerator for pulsing packets of ions;

ion mirrors arranged to receive the ions from the ion accelerator and reflect them in a first dimension (x-dimension) between the ion mirrors as the ions travel in a second dimension (z-dimension);

first and second ion reflectors arranged such that when they are both activated they reflect the ions back and forth in the second dimension;

an ion detector arranged to receive the ions, when a first of the ion reflectors is deactivated; and control circuitry configured to:

control the ion accelerator to perform a first pulse sequence that pulses a first plurality of packets of ions into the ion mirrors;

control the reflectors such that ions in said plurality of packets are reflected back and forth in the second dimension by the reflectors at the same time; and control the range of mass to charge ratios that is able to be transmitted by the mass filter or mass separator to the ion accelerator, and the timings at which the first reflector is activated and deactivated, such that substantially all of the ions from said plurality of packets of ions undergo the same number of reflections in the second dimension before being received at the detector.

2. The spectrometer of claim 1, wherein the second dimension is orthogonal to the first dimension.

3. The spectrometer of claim 1, wherein said first pulse sequence is an encoded frequent pulse sequence in which the duration between any two pulses in the first pulse sequence is different to the duration between any other two pulses in the first pulse sequence.

4. The spectrometer of claim 1, wherein the first pulse sequence consists of a plurality of pulses, starting with a first pulse and ending with a final pulse; and wherein the control circuitry is configured to change the first reflector from being in a deactivated state, in which it does not reflect ions in the second dimension, to being in an activated state, in which it does reflect ions in the second dimension, at a time corresponding to the time that the lowest mass to charge ratio ion from said first pulse would reach the first reflector for the first time after having travelled a distance in the second dimension that is at least from one end of the ion mirrors to the other end of the ion mirrors.

5. The spectrometer of claim 4, wherein the control circuitry is configured to: maintain the first reflector activated for a period of time substantially corresponding to the time that said lowest mass to charge ratio ion from said first pulse would take to travel an integer number n of round trips from the first reflector to the second reflector and back to the first reflector; and to deactivate the first reflector at the end of said period of time such that said lowest mass to charge ratio ion may pass to the detector.

6. The spectrometer of claim 5, wherein the control circuitry is configured to control the ion accelerator such that the final pulse in the first pulse sequence occurs at least a time Tx before the first reflector is deactivated, wherein Tx is the time it would take the highest mass to charge ratio ion in said range of mass to charge ratios to travel from the ion accelerator to said first reflector and then travel n−1 round trips from the first reflector to the second reflector and back to the first reflector.

7. The spectrometer of claim 5, wherein the control circuitry is configured to:

control the ion accelerator to perform a second pulse sequence that pulses a second plurality of packets of ions into the ion mirrors;

control the reflectors such that ions in said second plurality of packets are reflected back and forth in the second dimension by the reflectors at the same time; and control the range of mass to charge ratios that is able to be transmitted by the mass filter or mass separator to the ion accelerator, and the timings at which the first reflector is activated and deactivated, such that substantially all of the ions from said second plurality of packets of ions undergo the same number of reflections in the second dimension before being received at the detector.

8. The spectrometer of claim 7, wherein the control circuitry is configured to reactivate the first reflector at a time Tr after the first reflector was deactivated, wherein Tr is at least the time it takes the heaviest mass to charge ratio ion from a pulse in the first pulse sequence to make one of said round trips from the first reflector to the second reflector and back to the first reflector.

9. The spectrometer of claim 8, wherein the control circuitry is configured to control the ion accelerator to perform the first pulse in the second pulse sequence at or less than a time Ts before the first reflector is reactivated, wherein Ts is the time it takes the lowest mass to charge ratio ion from the first pulse of the second pulse sequence would reach the first reflector for the first time after having travelled at least a distance in the second dimension that is from one end of the ion mirrors to the other end of the ion mirrors.

10. The spectrometer of claim 7, wherein the control circuitry is configured to apply voltage pulses to said ion accelerator in order to perform the plurality of pulses in each of the pulse sequences and also to apply voltage pulses to said ion accelerator in the time period between said pulse sequences, and to control the spectrometer to either: (i) block ions pulsed by the ion accelerator during the time period from reaching the detector; or (ii) block ions being received at the ion accelerator during the time period.

11. The spectrometer of claim 1, wherein the ion accelerator is located at the same end of the ion mirrors, in the second dimension, as the detector.

12. The spectrometer of claim 1, wherein the ion accelerator is located at the opposite end of the ion mirrors, in the second dimension, to the detector.

13. The spectrometer of claim 1, comprising periodic lenses arranged between the ion mirrors such that the ion packets pass through the periodic lenses during at least some of the times that they travel from one of the ion mirrors into the other of the ion mirrors, wherein the spectrometer is configured to apply voltages to the periodic lenses so as to focus the ion packets, in the second dimension, as they pass therethrough.

14. The spectrometer of claim 13, wherein one or more of the periodic lenses is arranged between the ion accelerator and the second reflector; and/or one or more of the periodic lenses is arranged between the first reflector and the detector.

15. A method of mass spectrometry comprising:

providing a multi-reflecting time of flight mass analyser as claimed in claim 1;

transmitting ions having a restricted range of mass to charge ratios to the mass analyser;

pulsing the ion accelerator according to a first pulse sequence so as to pulse a first plurality of packets of ions into a first of the ion mirrors such that the ions are reflected in a first dimension (x-dimension) between the ion mirrors as the ions travel in a second dimension (z-dimension);

controlling the reflectors such that ions in said plurality of packets are reflected back and forth in the second dimension by the reflectors at the same time; and then deactivating the first reflector such that ions can pass to the detector;

wherein the timings at which the first reflector is activated and deactivated are controlled such that substantially all of the ions from said plurality of packets of ions undergo the same number of reflections in the second dimension before being received at the detector.

16. A mass or mobility spectrometer comprising:

a filter or separator for filtering or separating ions according to a physicochemical;

an ion accelerator for pulsing packets of ions;

ion-optics arranged to guide ions along an a first dimension (z-dimension);

first and second ion reflectors arranged such that when they are both activated they reflect the ions back and forth in the first dimension;

an ion detector arranged to receive the ions, when a first of the ion reflectors is deactivated; and control circuitry configured to:

control the ion accelerator to perform a first pulse sequence that pulses a first plurality of packets of ions into the ion-optics;

control the reflectors such that ions in said plurality of packets are reflected back and forth in the first dimension by the reflectors at the same time; and control the range of values of the physicochemical property that is able to be transmitted by the filter or separator to the ion accelerator, and the timings at which the first reflector is activated and deactivated, such that substantially all of the ions from said plurality of packets of ions undergo the same number of reflections in the first dimension before being received at the detector.

17. A mass or mobility spectrometer comprising:

a filter or separator for filtering or separating ions according to a physicochemical;

an ion accelerator for pulsing packets of ions;

ion optics arranged to receive the ions from the ion accelerator and guide them along an ion path;

at least one ion deflector or reflector operable in a first mode so as to allow or cause ions to remain on said ion path and a second mode so as to allow or cause ions to be ejected from the ion path; and control circuitry configured to:

control the ion accelerator to perform a first pulse sequence that pulses a first plurality of packets of ions into the ion optics and along said ion path such that ions in said plurality of packets travel along, or around, the ion path at the same time; and control the range of values of the physicochemical property that is able to be transmitted by the physicochemical filter or separator to the ion accelerator, and the timings at which the at least one deflector or reflector is operated in the first and second modes, such that substantially all of the ions from said plurality of packets of ions undergo the same number of passes along or around the ion path before being ejected from the ion path.

* * * * *